(12) United States Patent
Spivey et al.

(10) Patent No.: US 10,092,012 B2
(45) Date of Patent: Oct. 9, 2018

(54) METHODS AND SYSTEMS FOR PREPARING DOUGH-BASED PRODUCTS

(71) Applicant: HDN Development Corporation, Winston-Salem, NC (US)

(72) Inventors: Guy M. Spivey, Lexington, NC (US); Ernest V. Thompson, Jr., Lewisville, NC (US); Michael Bradley Wall, Yadkinville, NC (US)

(73) Assignee: HDN Development Corporation, Winston-Salem, NC (US)

( * ) Notice: Subject to any disclaimer, the term of this patent is extended or adjusted under 35 U.S.C. 154(b) by 0 days.

(21) Appl. No.: 13/886,387

(22) Filed: May 3, 2013

(65) Prior Publication Data

US 2013/0295255 A1 Nov. 7, 2013

Related U.S. Application Data

(60) Provisional application No. 61/642,843, filed on May 4, 2012.

(51) Int. Cl.
*A23L 3/005* (2006.01)
*A21C 13/02* (2006.01)
*A21B 5/08* (2006.01)

(52) U.S. Cl.
CPC ............... *A21C 13/02* (2013.01); *A21B 5/08* (2013.01)

(58) Field of Classification Search
USPC ........... 99/360–362, 367, 404, 443 R, 443 C
See application file for complete search history.

(56) References Cited

U.S. PATENT DOCUMENTS

| | | | |
|---|---|---|---|
| 3,881,403 A | 5/1975 | Ingram et al. | |
| 3,882,768 A | 5/1975 | Troisi et al. | |
| 4,189,994 A | 2/1980 | Schmader | |
| 5,463,940 A | 11/1995 | Cataldo | |
| 5,701,806 A | 12/1997 | Martinez | |
| 6,511,689 B2 | 1/2003 | Lowry et al. | |
| 6,564,699 B1* | 5/2003 | Vincente et al. | 99/468 |
| 6,870,136 B1* | 3/2005 | Majordy | F27D 7/04 219/400 |
| 7,029,715 B2 | 4/2006 | McCall et al. | |
| 2002/0035931 A1 | 3/2002 | Tschopp et al. | |

OTHER PUBLICATIONS

Patent Cooperation Treaty, International Search Report and Written Opinion, International Application No. PCT/US2013/039376, dated Aug. 9, 2013.
Patent Cooperation Treaty, International Preliminary Report on Patentability, International Application No. PCT/US2013/039376, dated Nov. 13, 2014.

* cited by examiner

*Primary Examiner* — Lien T Tran
(74) *Attorney, Agent, or Firm* — Kilpatrick Townsend & Stockton LLP

(57) ABSTRACT

Systems, apparatuses, and method for preparing dough-based products are disclosed. One disclosed system for preparing dough-based products comprises a fryer comprising a bottom and at least one sidewall, a proofer comprising a proofing chamber with a top, bottom, and at least one sidewall, and a conveying mechanism configured to transport the dough-based products from the proofing chamber to the fryer, wherein the top of the proofing chamber is located below the bottom of the fryer.

20 Claims, 19 Drawing Sheets

METHODS AND SYSTEMS FOR PREPARING DOUGH-BASED PRODUCTS

REFERENCE TO RELATED APPLICATION

This application claims priority to U.S. Provisional Patent Application No. 61/642,843, entitled "Method and Systems for Preparing Dough-Based Products" and filed May 4, 2012, the entirety of which is hereby incorporated by reference.

FIELD OF THE INVENTION

The present invention relates generally to methods and systems for preparing dough-based products.

BACKGROUND

Consumers enjoy freshly prepared dough-based products. For example, retail stores selling hot doughnuts, prepared on-site, have been and continue to be quite popular. Further, some such retail stores are configured to allow consumers to view the doughnut preparation process, which has also proven popular with consumers. The ability to prepare doughnuts from scratch in a retail store location typically requires equipment to mix the dough, to extrude the dough, to proof the dough, to fry the dough and/or to perform any finishing steps, such as glazing, icing, filling or topping. Typically, the equipment needed to perform these tasks occupies a considerable amount of space in the retail store. The necessary capital investment and operating costs to maintain a retail store location having the space required to prepare doughnuts from scratch often do not justify opening retail stores having such capabilities in smaller markets. For example, in a market that may only demand three hundred (300) dozen doughnuts per day, it may not be economically feasible for a company to open a store with sufficient space to include on-site mixing, extruding, proofing, cooking and finishing of doughnuts. In other scenarios there may be sufficient demand to support the cost of a larger store, but there may not be enough available space in a desirable location. For example, a retail store located in an airport or a shopping mall may provide high demand, but the retail spaces available may not provide the space required to house the required equipment for preparing fresh doughnuts on site.

SUMMARY

The present invention relates generally to systems and apparatuses for preparing dough-based products, and to methods for preparing dough-based products. Examples of dough-based products that may be prepared using the various methods, systems, and apparatuses of the present invention include, without limitation, doughnuts, ring doughnuts, doughnut shells, doughnut holes, cake doughnuts, doughnut twists, cinnamon rolls, various types of bread, and other products. Some embodiments of the present invention can be useful for preparing dough-based products in locations having limited physical space. Some embodiments of the present invention can also be useful in accommodating the manufacture of both low volumes and high volumes of dough-based products depending on desired output.

In some embodiments, a system for preparing dough-based products comprises a fryer comprising a bottom and at least one sidewall, a proofer comprising a proofing chamber with a top, bottom, and at least one sidewall, and a conveying mechanism configured to transport the dough-based products from the proofing chamber to the fryer, wherein the top of the proofing chamber is located below the bottom of the fryer. In some embodiments, the proofer comprises a heater and a sensor, wherein the sensor is positioned in the proofing chamber. In some embodiments, the sensor is a temperature sensor. The system, in some embodiments, further comprises a fan in fluid communication with the heater, and an air return duct coupled to the heater. The proofer further comprises a second heater in some embodiments. The first heater and the second heater are positioned at one end of the proofer in some embodiments. The system, in some embodiments, further comprises a humidifier disposed within the proofer. In one such embodiment, the system further comprises a humidity sensor positioned within the proofing chamber. In some embodiments, the conveying mechanism comprises a plurality of moveable trays coupled to at least one chain and a motor coupled to the at least one chain. In some embodiments, the height of the at least one side wall of the fryer is less than about 20 inches. The fryer comprises a manifold defining a plurality of perforations in some embodiments.

In some embodiments, a system for preparing dough-based products comprises a fryer, and a proofer operatively coupled to fryer, wherein the proofer comprises a housing, a proofing chamber disposed within the housing, and means for providing heated air to the proofing chamber, wherein the proofer is positioned below the fryer. In some embodiments, the proofer further comprises means for controlling the temperature of the heated air. The system further comprises means for humidifying the heated air in some embodiments. The system, in some embodiments, further comprises means for conveying dough-based products through the proofer to the fryer. In some embodiments, the fryer comprises means for circulating shortening.

In some embodiments, a method for preparing dough-based products comprises conveying a plurality of dough-based products on a plurality of trays through a proofer, vertically conveying the dough-based products on the plurality of trays from the proofer to a fryer, wherein the bottom of the fryer is positioned above the top of the proofer, and cooking the dough-based products in the fryer. In some such embodiments, cooking the dough-based products in the fryer comprises pumping shortening through a manifold to circulate the shortening within the fryer, heating the shortening with heating elements positioned in the fryer, and conveying the dough-based products through the fryer, wherein the dough-based products are in contact with the heated shortening. In some embodiments, the method further comprises flipping the dough-based products. In some embodiments, the dough-based products are doughnuts.

These and other embodiments of the present invention are described in greater detail in the Detailed Description that follows.

DETAILED DESCRIPTION

Figure 1:
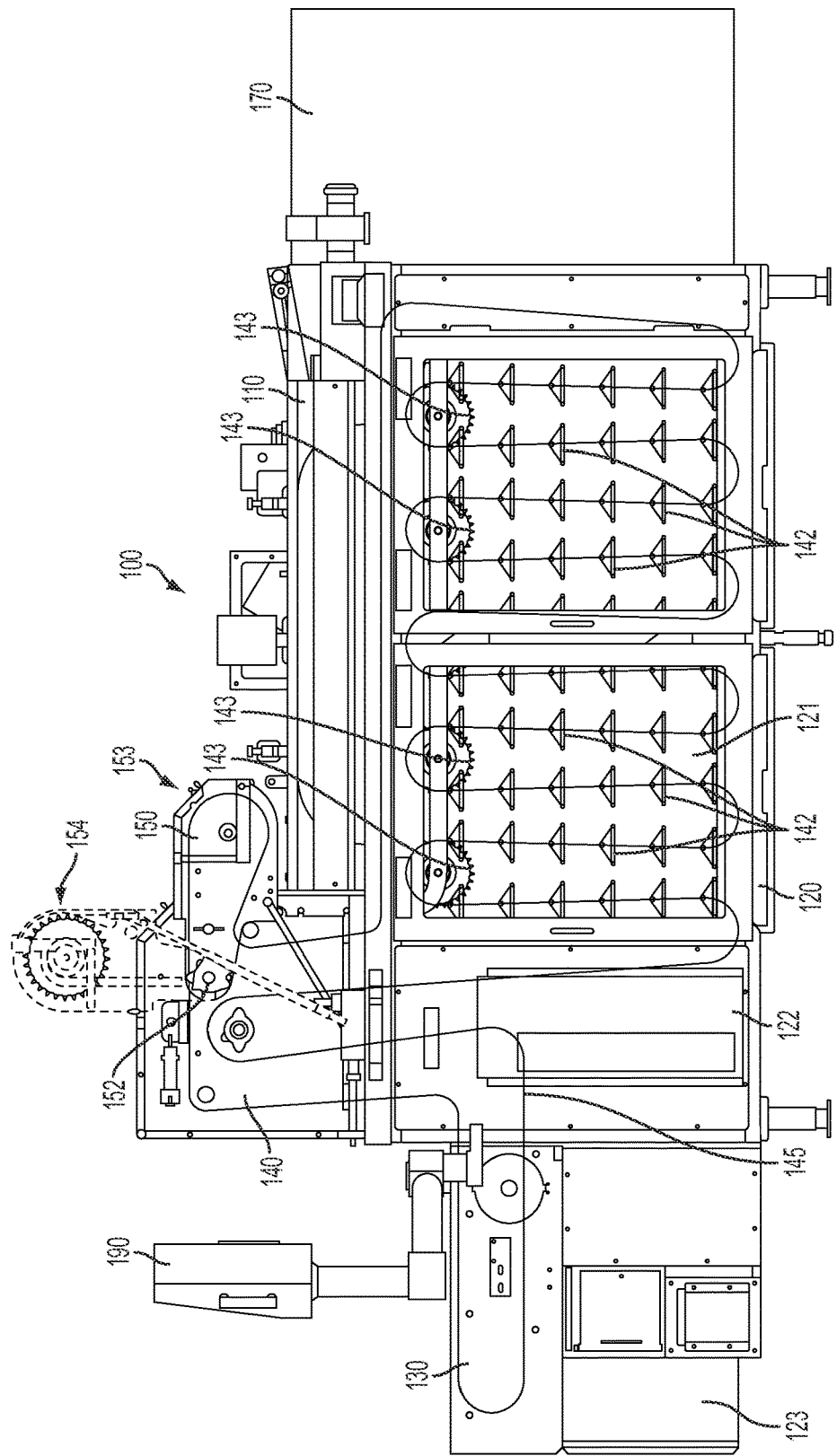
FIG. 1 illustrates a side view of a system for preparing dough-based products according to one embodiment of the present invention.

The present invention relates generally to methods, systems, and apparatuses for preparing dough-based products. Examples of dough-based products that may be made using the methods and apparatuses of the present invention include, without limitation, doughnuts, ring doughnuts, doughnut shells, doughnut holes, cake doughnuts, doughnut twists, cinnamon rolls, and various types of bread. Some embodiments of the present invention can be particularly useful for preparing dough-based products in locations, such as retail stores or kiosks, where space is limited.

As discussed above, systems, methods, and apparatuses for preparing dough-based products, such as doughnuts, can require a considerable amount of space. For example, in one existing system for making doughnuts, an extruder, a proofer, and a fryer are arranged serially in a horizontal plane. Regardless of the desired output of such a system (e.g., number of doughnuts per hour), such a configuration requires an operating space having substantial minimum length and substantial minimum overall area requirements to allow for positioning and operation of the system.

As noted above, some embodiments of the present invention relate to compact systems and methods for preparing dough-based products that require less space in terms of overall area and minimum length to make dough-based products. For example, in one embodiment a system for preparing dough-based products can comprise an inlet, a proofer, and a fryer, wherein the proofer is positioned below the fryer. In some embodiments of systems, the fryer can be positioned below proofer. In an embodiment where a fryer is positioned beneath a proofer, an exhaust hood or similar device may be needed to capture gas coming off the shortening, oil, or other fluid in the fryer. In positioning the proofer below the fryer, or vice-versa, the overall footprint of the system can be significantly reduced in some embodiments. For example, in an embodiment that can produce approximately 110 dozen doughnuts per hour, with the proofer positioned beneath the fryer, the length and width of the apparatus can be less than 105 inches and less than 50 inches, respectively, in some embodiments of the present invention. However, embodiments of the present invention may have production capacities less or more than 110 dozen doughnuts per hour. For example, some embodiments can produce 55 dozen doughnuts per hour, while other embodiments can produce 220 dozen doughnuts per hour.

Some embodiments of the present invention are directed to systems for preparing dough-based products that comprise a fryer and a proofer operatively coupled to fryer, wherein the proofer is positioned below the fryer. In some embodiments, the proofer comprises a housing, a proofing chamber disposed within the housing, a heating system and a humidity control system.

In some embodiments, the heating system comprises a first heater internally positioned at a distal end of a side of the housing and a second heater internally positioned at a distal end of a second side of the housing, at least one air blower in fluid communication with the first and second heaters to propel or provide heated air into one end of the proofing chamber. In some embodiments, a single heater can be utilized to warm air for use in the proofer. In some embodiments, a first air return duct can be positioned along one side of the proofing chamber and a second air return duct can be positioned along a second side of the proofing chamber, wherein the first air return duct is coupled to a first heater and the second air return duct is coupled to a second heater. In some embodiments, the heating system comprises one or more temperature sensors located within the proofing chamber and the humidity control system comprises one or more humidity sensors located within the proofing chamber.

In some embodiments, systems for preparing dough-based products of the present invention can comprise a conveying system. In some embodiments, the conveying system can comprise a first plurality of guide sprockets disposed along a side of the apparatus and a second plurality of guide sprockets disposed along an opposite side of the apparatus, a first chain coupled to the first plurality of guide sprockets and a second chain coupled to the second plurality of guide sprockets, a plurality of trays, wherein one end of each tray is coupled to the first chain and a second end of each tray is coupled to the second chain, and a motor operatively coupled to at least one of the chains. In some embodiments, a first motor can be operatively coupled to at least one of the chains in one portion of the system (e.g., within the proofer) and a second motor can be operatively coupled to at least one of the chains in a second portion of the system (e.g., within the fryer). In embodiments where multiple motors are used as part of the conveyor system, the motors can be synchronized utilizing an encoder/sensor arrangement using techniques known to those of skill in the art.

In some embodiments, systems for preparing dough-based products of the present invention further comprise a removably attachable accessory for depositing dough-based products into a fryer. In such an embodiment, the system for preparing dough-based products of the present invention can further comprise a movable outlet for permitting the attachment of the accessory for directly depositing dough-based products into the fryer.

In some embodiments of the system for preparing dough-based products of the present invention, the fryer can comprise a bottom and at least one side wall. The height of the side wall can be less than about 20 inches, less than about 16 inches, less than about 12 inches, or less than about 8 inches in various embodiments. In some embodiments, the fryer can comprise a manifold for facilitating shortening circulation.

Some embodiments of the present invention also relate to methods for preparing dough-based products. In some embodiments, methods for preparing dough-based products comprise transporting dough-based products through a proofer, and cooking the dough-based products in a fryer, wherein the proofer is positioned below the fryer. The methods, in some embodiments, further comprise proofing the doughnuts in the proofer. In some embodiments, transporting dough-based products can comprise conveying the dough-based products on a plurality of trays through a proofer, vertically conveying the dough-based products to a fryer positioned above the proofer, and conveying the dough-based products through the fryer. In some embodiments, cooking dough-based products in a fryer comprises pumping shortening through a manifold to circulate the shortening within a fryer and/or heating the shortening with one or more heating elements positioned in the fryer.

In some embodiments, the methods utilize systems of the present invention that may incorporate a proofer positioned beneath a fryer. In one non-limiting embodiment of such a method, uncooked dough-based products are loaded onto a conveying mechanism. For example, in some embodiments, an operator may manually load uncooked dough-based products onto a conveying mechanism. The uncooked dough-based products may previously have been extruded and/or cut. The uncooked dough-based products may be frozen in some embodiments. In some embodiments, the dough-based products may be automatically loaded onto a conveying mechanism. For example, in such embodiments, the uncooked dough-based products may be extruded and/or cut directly onto a conveying mechanism. For example, equipment for automatically extruding and cutting the dough-based products may be used. Non-limiting examples of such equipment are shown and described in U.S. Pat. Nos. 6,511,689 and 7,029,715, which are hereby incorporated by reference, although other known systems for automatically extruding and/or cutting dough can be used.

The conveying mechanism can transport uncooked, dough-based products to and through a proofer in some embodiments. The term "proofer" generally refers to an apparatus that facilitates the proofing of uncooked dough or dough-based products. As is known to those of skill in the art, proofing is the step in which dough incorporating yeast is allowed to rest and rise prior to baking, frying, or cooking. When proofing dough in a proofer or similar apparatus, the proofing time, proofing temperature, and humidity can be controlled as known to those of skill in the art to obtain a desirable end product.

While a proofer is used to proof yeast-based dough, in some embodiments of the present invention, systems and methods of the present invention can also be used to prepare unleavened dough-based products including, for example and without limitation, cake doughnuts. In such embodiments, the dough may pass through the proofer on trays, but the settings on the proofer (e.g., temperature, humidity, and/or tray speed) may be configured in a manner different from the configuration required to proof yeast-based dough. For example, with unleavened dough for a cake product, the dough may be cut into desired shapes and may then simply pass through the proofer to a fryer or other cooking device. In such embodiments, the proofer settings may be configured to replicate room temperature and humidity.

In some embodiments, dough may be frozen and the proofer can be used to thaw the dough prior to frying or cooking by configuring the settings appropriately. In such embodiments, for example, frozen, uncooked dough-based products can be loaded onto trays and then transported through the proofer at a rate and at a temperature sufficient to thaw the dough prior to frying or cooking.

In some embodiments, systems or devices of the present invention can be configured to bypass the proofer (e.g., provide dough directly to a fryer) such as with dough-based products for which proofing is not required.

After proofing or otherwise passing through the proofer, the trays exit the proofer and the dough-based products are delivered to a fryer positioned above the proofer in some embodiments. The dough-based products are moved through the fryer by a fryer conveying mechanism and cooked by heated shortening circulated within the fryer. In one embodiment, a flipping mechanism is used to flip the dough-based products to provide thorough and even cooking of the dough-based products. For example, in some embodiments, the dough-based products are flipped approximately midway through the fryer in order to cook the portion of the dough-based product that had not previously been submerged within the shortening.

Upon reaching the end of the fryer, the dough-based products exit the fryer. In one embodiment, the dough-based products are transported for additional preparation. For example, the dough-based products may then be cooled, glazed, iced, filled, topped, and/or otherwise prepared using techniques known to those of skill in the art.

In some embodiments, such as those where proofing is not necessary (e.g., the dough-based products are not yeast-based or the dough has already been proofed), a system for preparing dough-based products can comprise an apparatus for providing dough-based products directly to the fryer. In such embodiments, the apparatus can be coupled directly to the fryer, bypassing the proofer positioned beneath the fryer. In some embodiments, a portion of the conveying mechanism (e.g., a portion of the conveying mechanism near the top of the proofer) can be moved to permit the attachment of the apparatus for supplying dough-based products directly into the fryer.

The following description relates to some embodiments of systems and apparatuses of the present invention for preparing dough-based products shown in the Figures and also illustrate some embodiments of methods of the present invention for preparing dough-based products.

FIGS. 1-18 illustrate features of various non-limiting embodiments of systems 100 and methods for preparing dough-based products.

Uncooked dough-based products are provided to a conveying mechanism 140 at inlet 130 shown in FIG. 1. As noted above, the uncooked dough-based products can be, for example, dough that has been extruded and cut into a desired shape. In some embodiments, the uncooked dough-based products can be provided using an extruder or an automatic extrusion device. In other embodiments, the uncooked dough-based products can be provided to the conveying mechanism manually by an operator.

Figure 2:
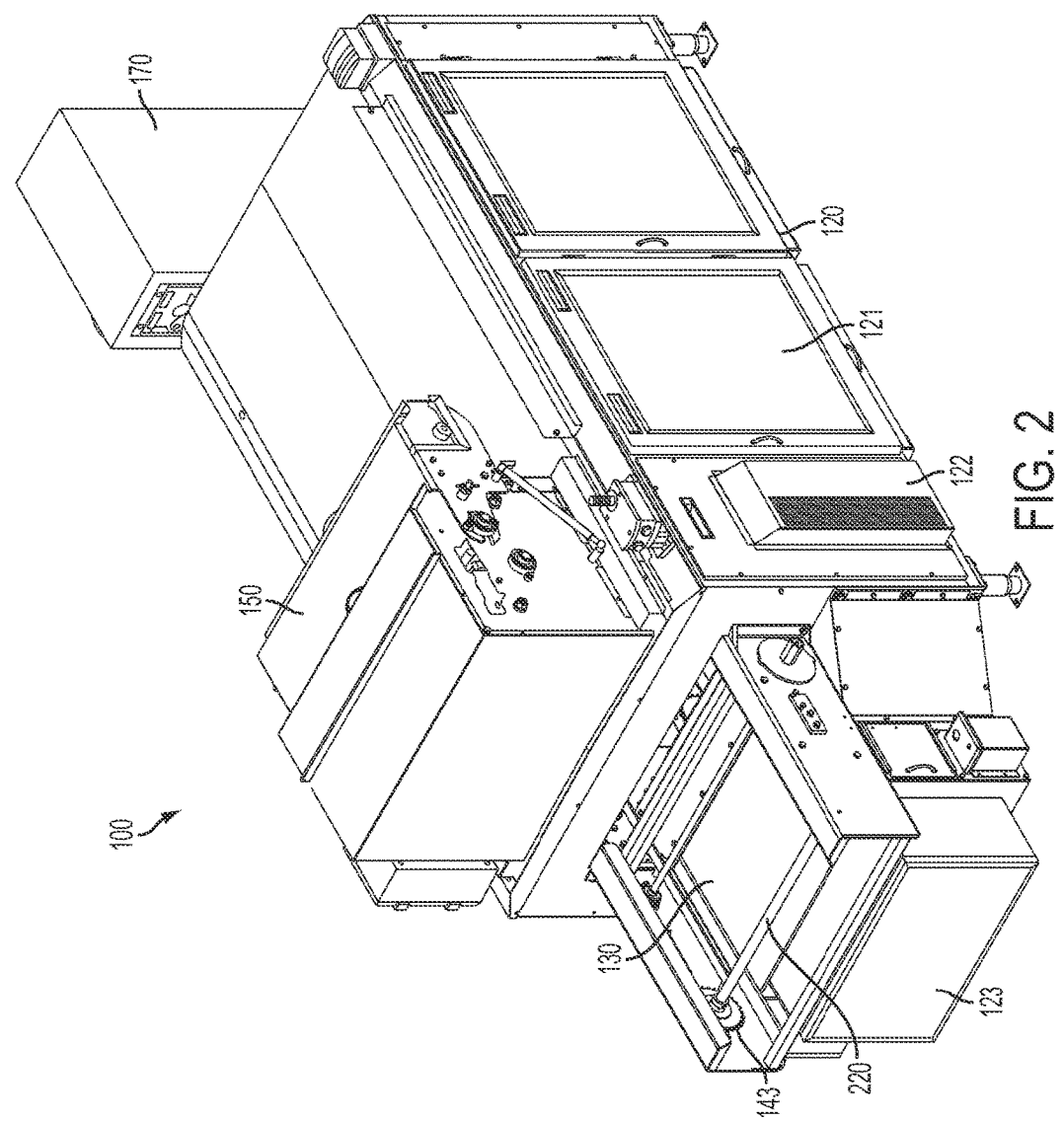
FIG. 2 illustrates a perspective view of a system for preparing dough-based products according to one embodiment of the present invention.
Figure 3:
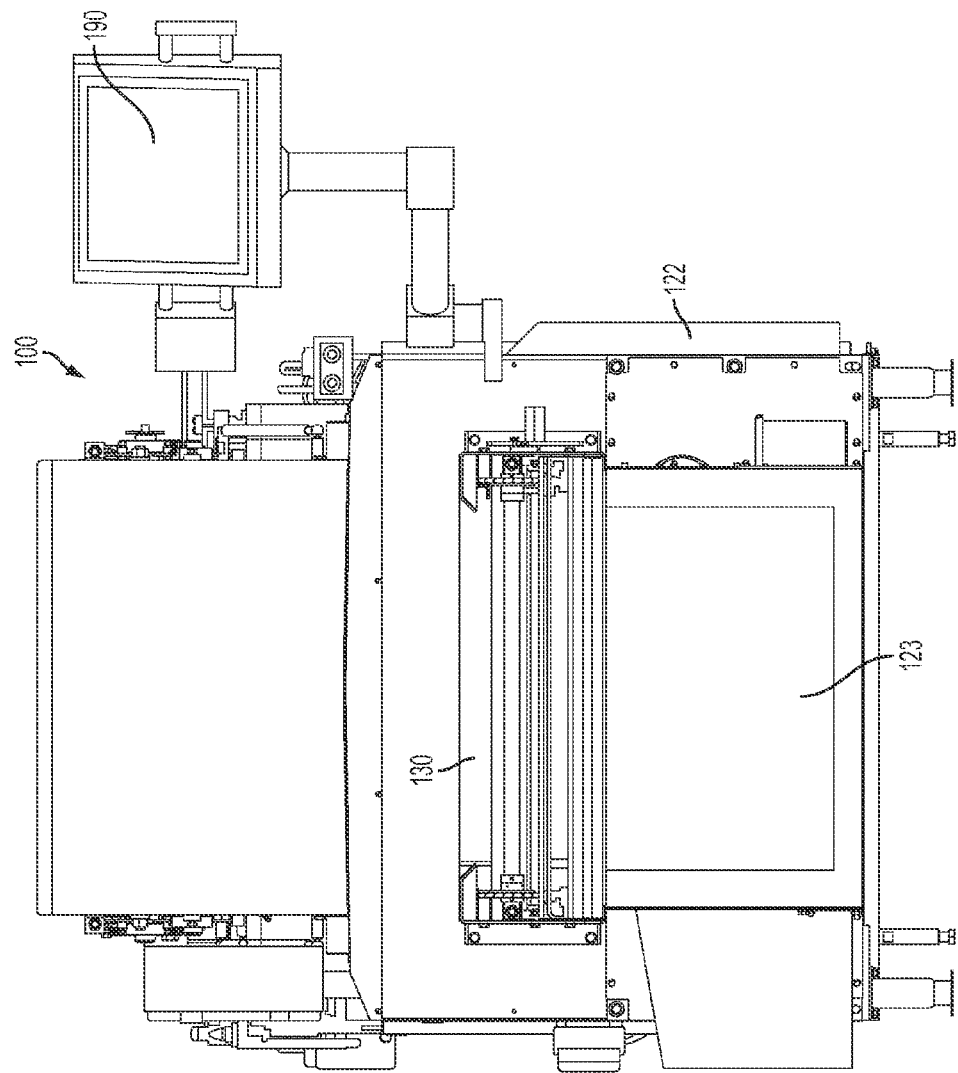
FIG. 3 illustrates a front view of a system for preparing dough-based products according to one embodiment of the present invention.
Figure 13:
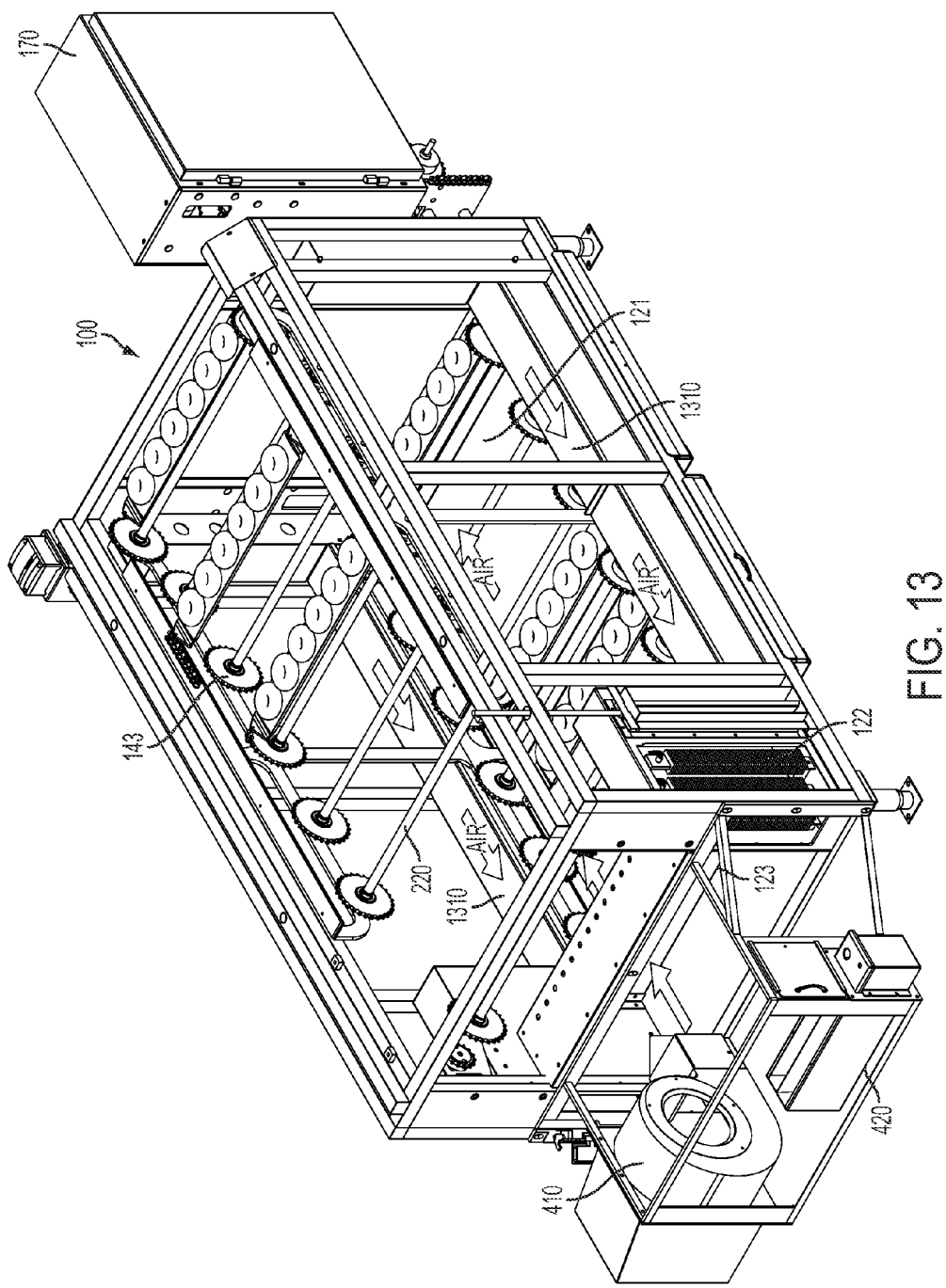
FIG. 13 illustrates a perspective view of a system for preparing dough-based products according to one embodiment of the present invention.
Figure 17:
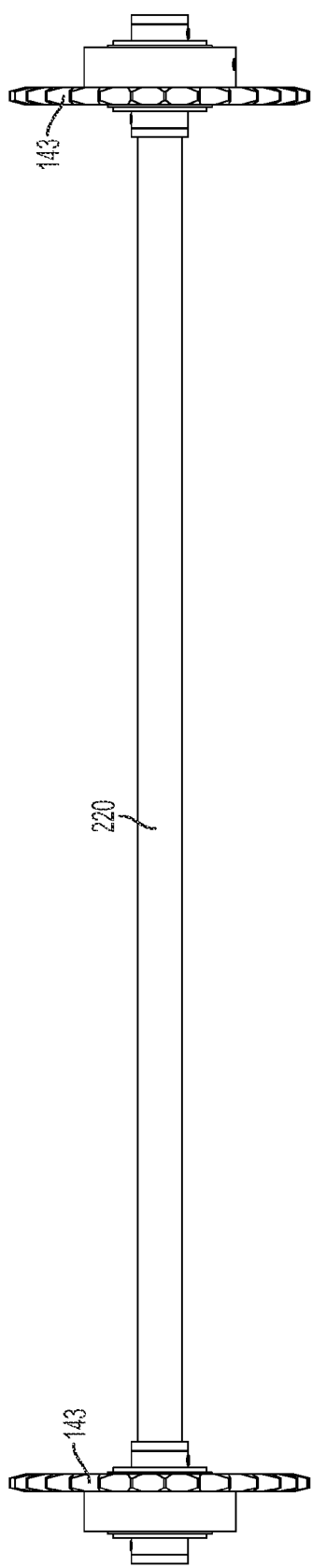
FIG. 17 illustrates a component of a system for preparing dough-based products according to one embodiment of the present invention.
Figure 18:
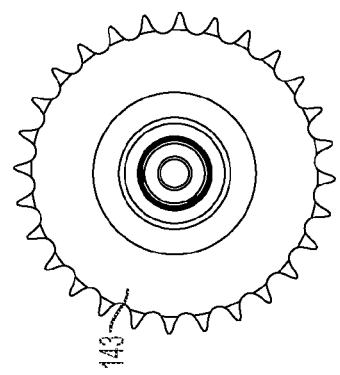
FIG. 18 illustrates a component of a system for preparing dough-based products according to one embodiment of the present invention.

In the embodiment shown, the conveying mechanism 140 is comprised of a plurality of trays 142 transported by a first chain 145 located on one side of system 100 and a second chain (not visible in the view shown in FIG. 1) located on the opposite side of system 100 (hereinafter "chain 146"). One or more drive motors housed within drive motor cabinet 170 drive chains 145, 146. In some embodiments with multiple drive motors, multiple drive motor cabinets can be provided although in other embodiments, multiple drive motors can be provided in a single cabinet. The drive motor configuration within the drive motor cabinet 170 is described below. Each of the chains 145, 146 are guided by a plurality of guide sprockets 143 shown in FIGS. 1, 2, 8, 13, 17, and 18 as well as other guide sprockets within the housing of system 100. To facilitate unified movement of chains 145, 146, a guide sprocket 143 may be mounted to a first distal end of a rod 220 as shown in FIGS. 2, 13 and 17, and a second guide sprocket 143 (not shown in FIG. 2) may be mounted to a second distal end of a rod 220. This configuration may be used for one or more guide sprocket pairs in system 100. The guide sprockets 143 are positioned to guide the trays 142 through a desirable path in the system 100. Persons of ordinary skill in the art will recognize that the number and location of the sprockets can vary depending on a number of factors including, for example, the size of the system, the width of the trays, the size of the motor, the weight of the dough-based products, and other factors. Similarly, and as noted above, conveying mechanisms other than chain and sprocket arrangements as known to those of skill in the art can also be used in some embodiments.

While the side view of the system 100 provided in FIG. 1 only illustrates the operation of the chain 145 located on the near side of the system 100, it is to be understood that chain 146 located on the opposite side of the system 100 operates in a similar manner.

The movement of the chains 145, 146 by the drive motor to transport the trays 142 through the system 100 is demonstrated by the full path of chain 145 shown in the embodiment of FIG. 1. In particular, the motor-driven chains 145, 146 transport the trays 142 in a counter clockwise direction along the path of chain 145. While trays 142 are only shown in the proofer 120, it should be understood that in this embodiment, trays are also present on the remainder of the chains 145, 146. The trays 142 are shown in the proofer 120 in this Figure because the proofer doors have windows so that the interior of the proofer 120 may be seen.

Beginning at inlet 130, where uncooked, dough-based products can be provided to the system 100, the motor-driven chains 145, 146 transport the trays 142 along the bottom portion of the horizontally parallel section of the path of chain 145 before proceeding in a substantially upward vertical direction and then proceeding in a substantially downward vertical direction before entering proofing chamber 121 of proofer 120. Again, in other embodiments, and depending on the particular size and equipment configuration, different conveying paths for the trays 142 can be configured.

Figure 8:
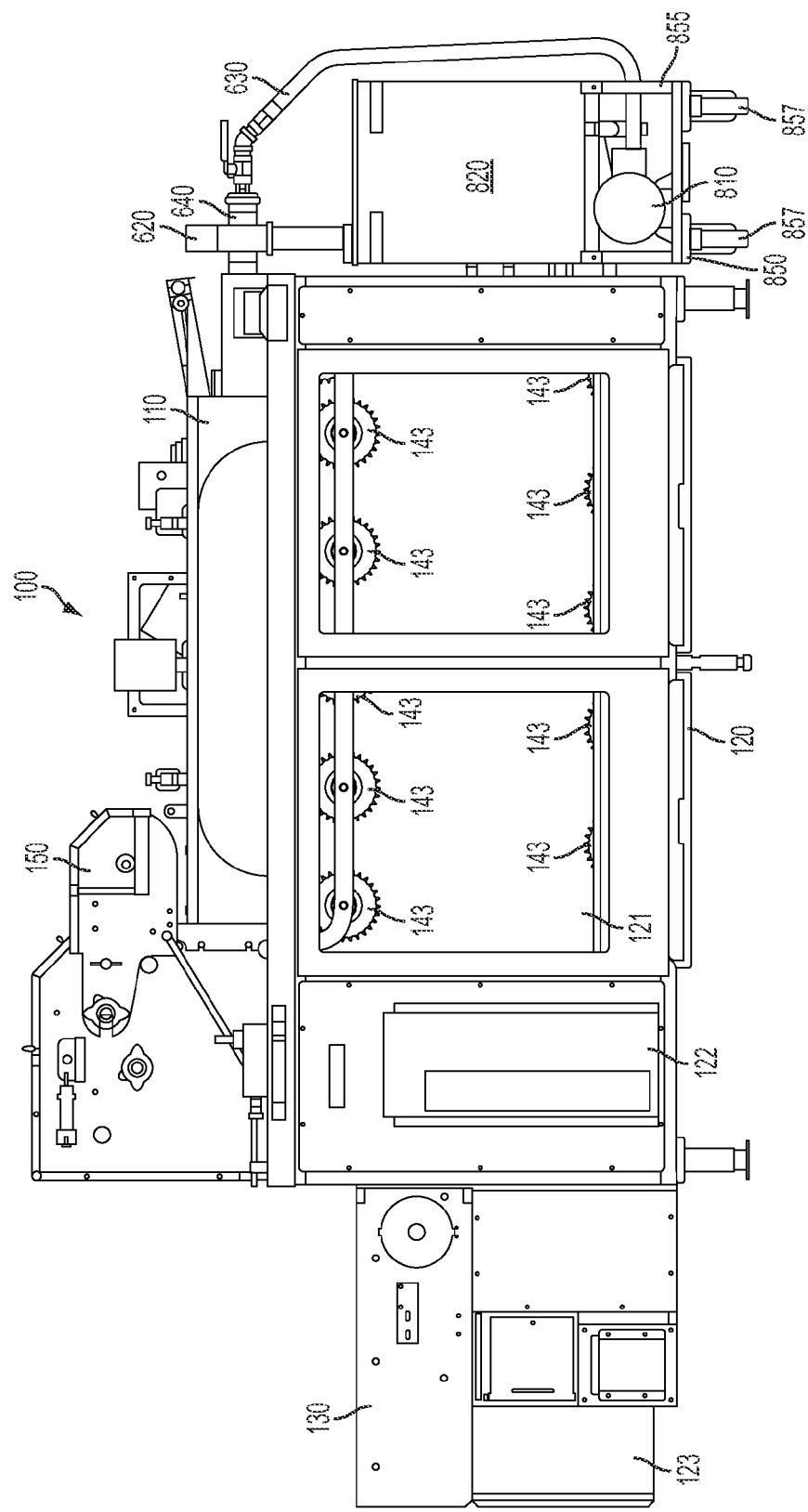
FIG. 8 illustrates a side view of a system for preparing dough-based products according to one embodiment of the present invention.

Within the proofing chamber 121, the chains 145, 146 wrap over a plurality of guide sprockets 143 (some of which are shown in FIG. 1 and FIG. 8) positioned near the top of the proofing chamber 121 and under a plurality of guide sprockets 143 (some of which are shown in FIG. 8) positioned near the bottom of the proofing chamber 121, thereby moving the trays 142 through the proofing chamber 121 in a serpentine pattern.

The proofer 120 subjects the uncooked, dough-based products to a particular temperature and humidity in some embodiments. In other words, in some embodiments, the temperature and humidity in the proofer 120 can be set and/or controlled to particular values in order to proof the dough-based products. The proofer 120 in the embodiments shown comprises a humidity box 123 configured to provide air at a desired humidity to the proofing chamber 121. The humidity box 123 includes a circulation fan 410 (shown in FIGS. 4 and 5). The circulation fan 410, in one embodiment, simultaneously blows air into and draws air from the proofing chamber 121 through two air return ducts 1310 coupled to two heaters positioned on the sides of the system 100. FIG. 13 illustrates the flow of air within the proofer using arrows that show air leaving the circulation fan 410, flowing through the proofer, and returning in the air return ducts 1310. While not wishing to be bound to any particular theory, it is believe that a more symmetrical air flow, such as shown in the embodiment of FIG. 13, can provide more consistent results in the proofing process.

Heated air can be provided to the proofing chamber in a number of ways. In one embodiment, a first heater 122 is positioned on a first side of the system 100 in the embodiments shown in FIGS. 1-3, 8, and 13. In some embodiments, a second heater (not visible in the FIGS.) can be positioned on the opposite side of the system 100 to heat the air and to control the temperature in the proofing chamber 121. The one or more heaters may use any means for heating air known to those having ordinary skill in the art. For example, the heating units may use electrically powered heating elements, a gas-fueled flame, or other techniques. The one or more heaters 122 heat the air returning from the proofing chamber 121 prior to entering the humidity box 123 and being returned to the proofing chamber 121.

In the embodiment illustrated in FIG. 13, the air return ducts are positioned along the bottoms of each side of the proofing chamber. In this embodiment, the circulation fan 410 draws air from the proofing chamber 121 into openings located at the distal ends of the air return ducts 1310 near the end of proofing chamber 121 opposite the humidity box 123. In other embodiments, the air return ducts may be positioned along the tops of each side of the proofing chamber 121. Air return ducts may also be positioned along the tops and bottoms of each side of the proofing chamber 121 in other embodiments. In further embodiments the air return ducts may be located along the outside of the proofing chamber 121, and in yet another embodiment, a single air return duct may be used. In some embodiments, the air entering the air return ducts may be at a temperature less than the temperature of the air entering the proofing chamber 121 from the humidity box 121.

Figure 4:
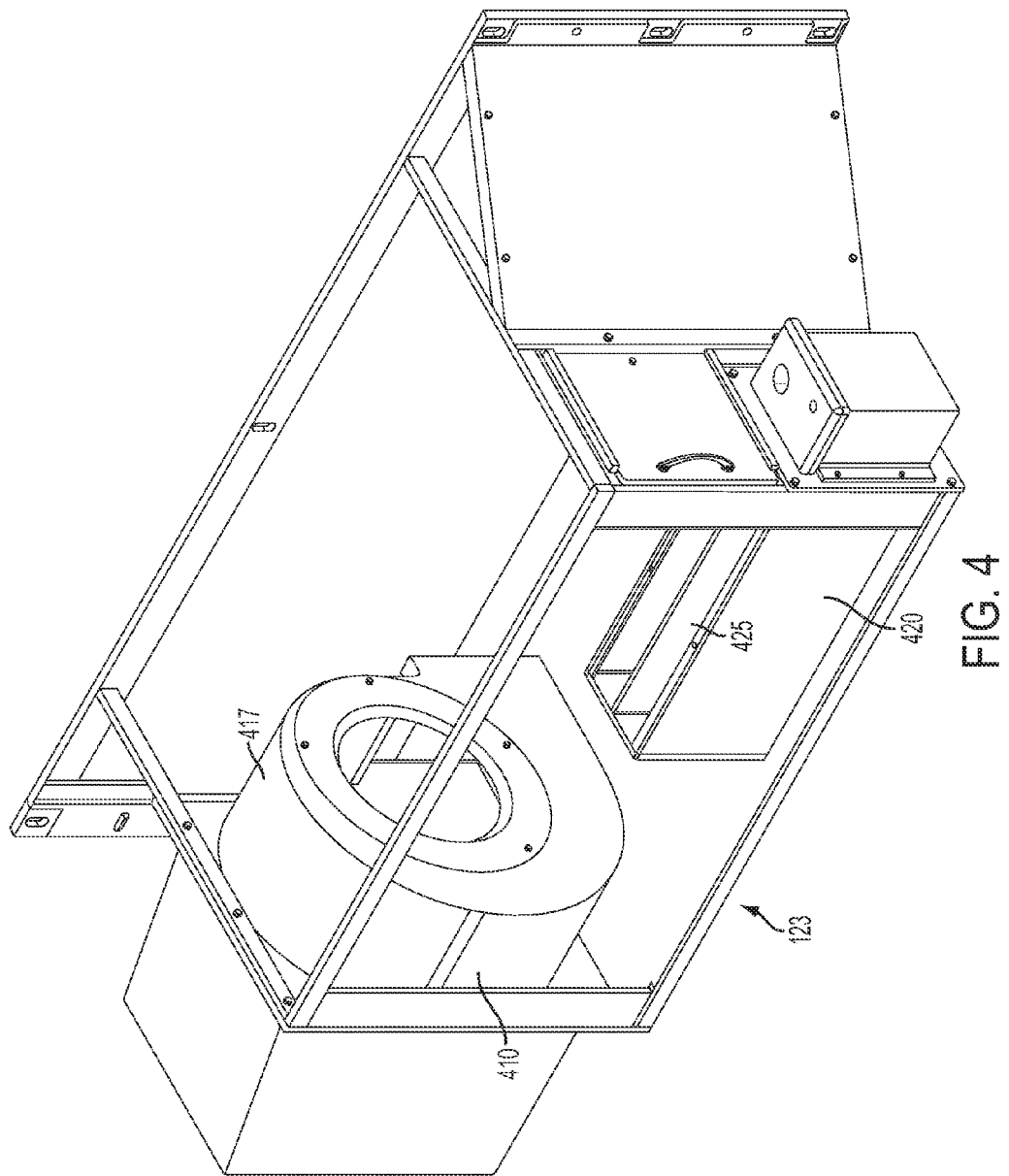
FIG. 4 illustrates an interior view of an aspect of a system for preparing dough-based products according to one embodiment of the present invention.
Figure 5:
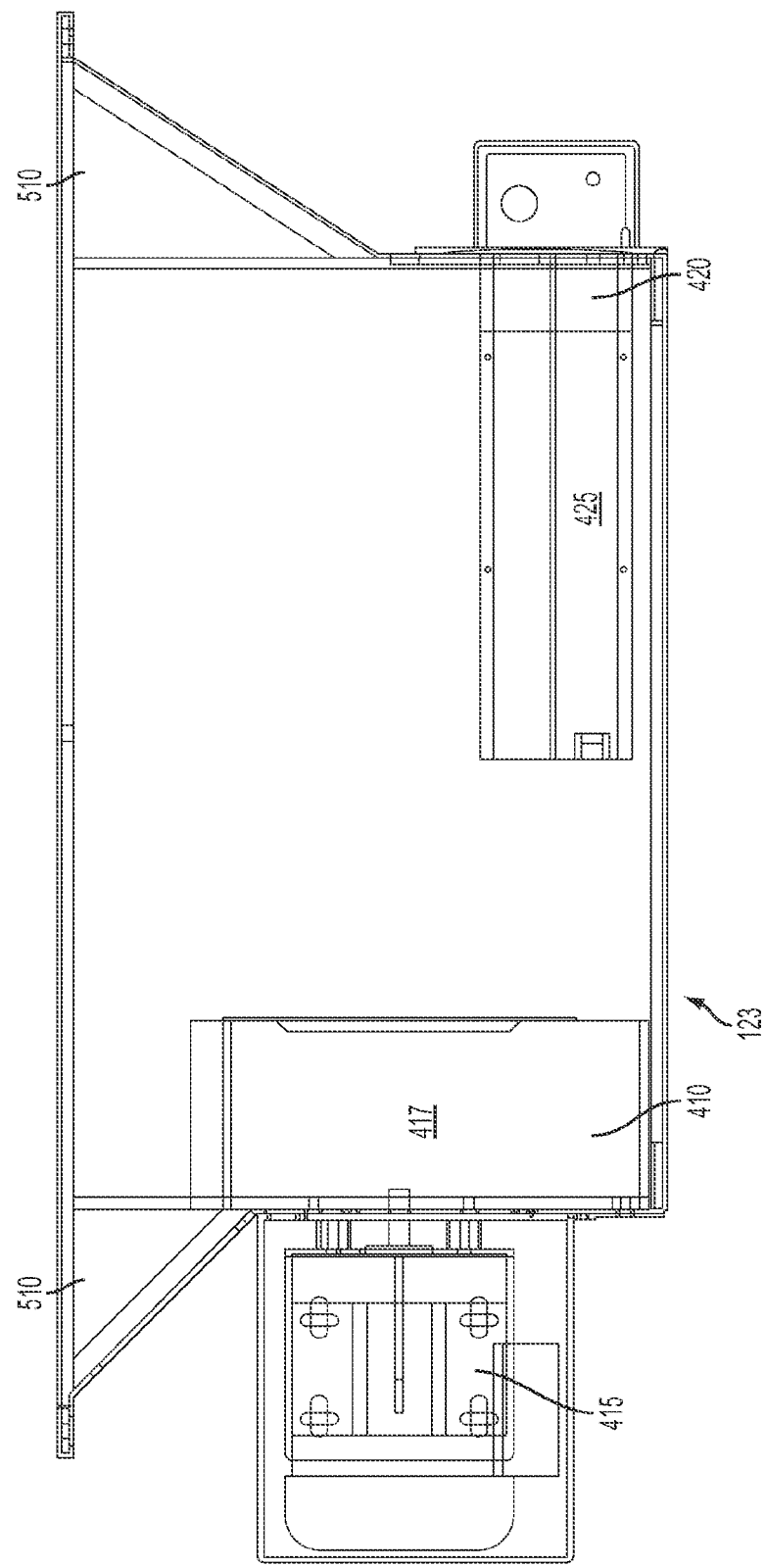
FIG. 5 illustrates a top interior view of an aspect of a system for preparing dough-based products according to one embodiment of the present invention.

The circulation fan 410 draws heated air from the heating units into humidity box 123 through air returns 510 (shown in FIG. 5). As shown in FIGS. 4, 5, and 13 humidity box 123 houses circulation fan 410 and a humidifier 420 operable to add humidity to the heated air within the humidity box 123.

As shown in FIG. 5, the circulation fan 410 comprises a blower wheel or fan 417 driven by a motor 415. The humidifier 420 comprises a humidity tank 425 that may be filled with water and two heating elements in the tank 425. In some embodiments, the humidity tank 425 can be coupled to a source of water and can be provided with a float level switch, or similar device, to control the amount of water in the humidity tank 425. For example, in some embodiments, if the water level goes below a predetermined minimum, a float level switch can add water to the humidity tank 425 until a predetermined maximum amount of water is in the humidity tank 425. Other configurations for providing moisture to the humidity box 123 that are known to those of skill in the art can be used.

Figure 20:
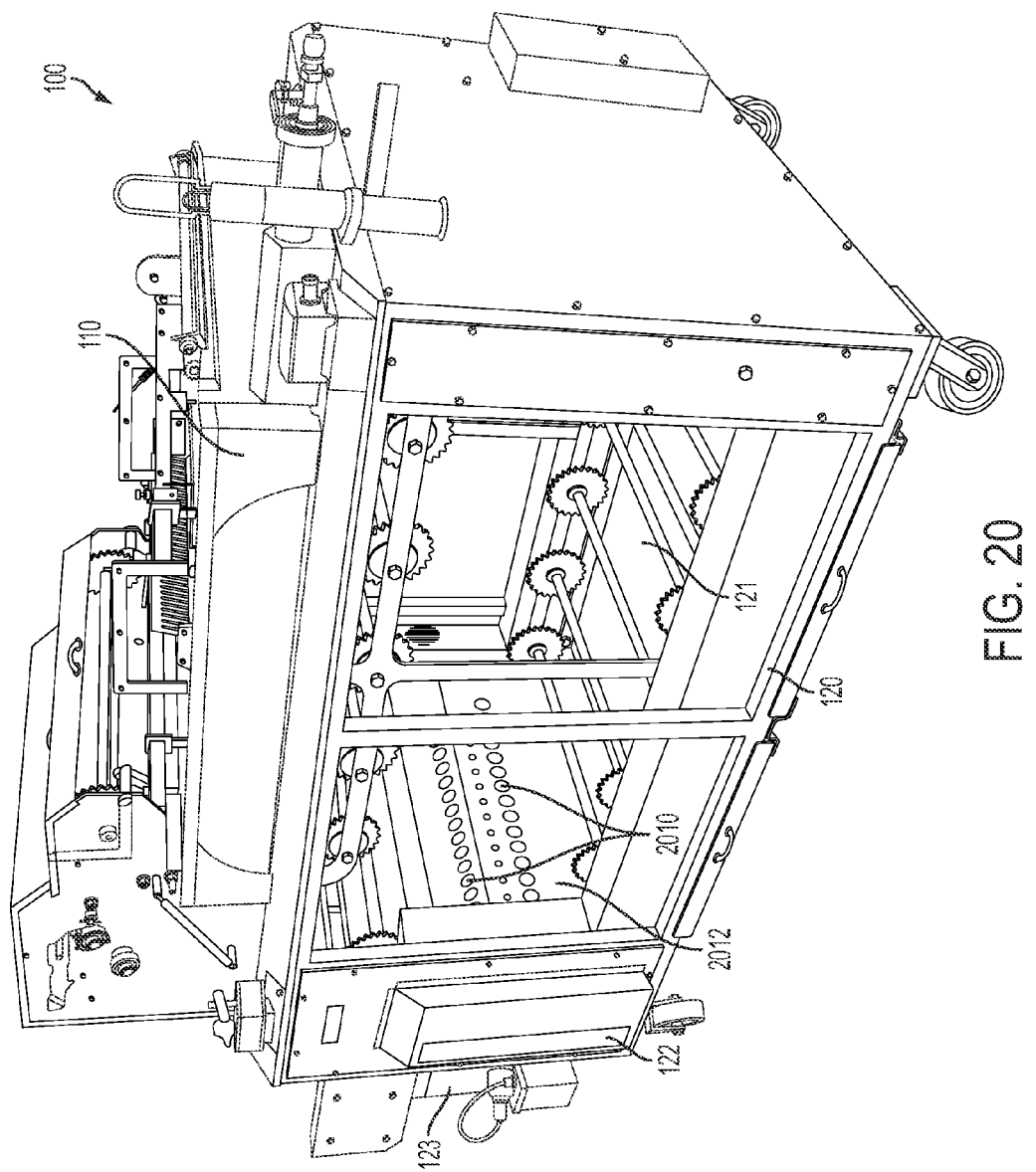
FIG. 20 is a perspective view of a system for preparing dough-based products according to one embodiment of the present invention.

In operation, the circulation fan 410 blows heated and humidified air through holes 2010 in wall 2012 shared by the humidity box 123 and the proofing chamber 121 (shown in FIG. 20). In this manner, the heated and humidified air passes through proofing chamber 121 to proof the dough-based products moving through the proofing chamber 121 on trays 142.

Figure 19:
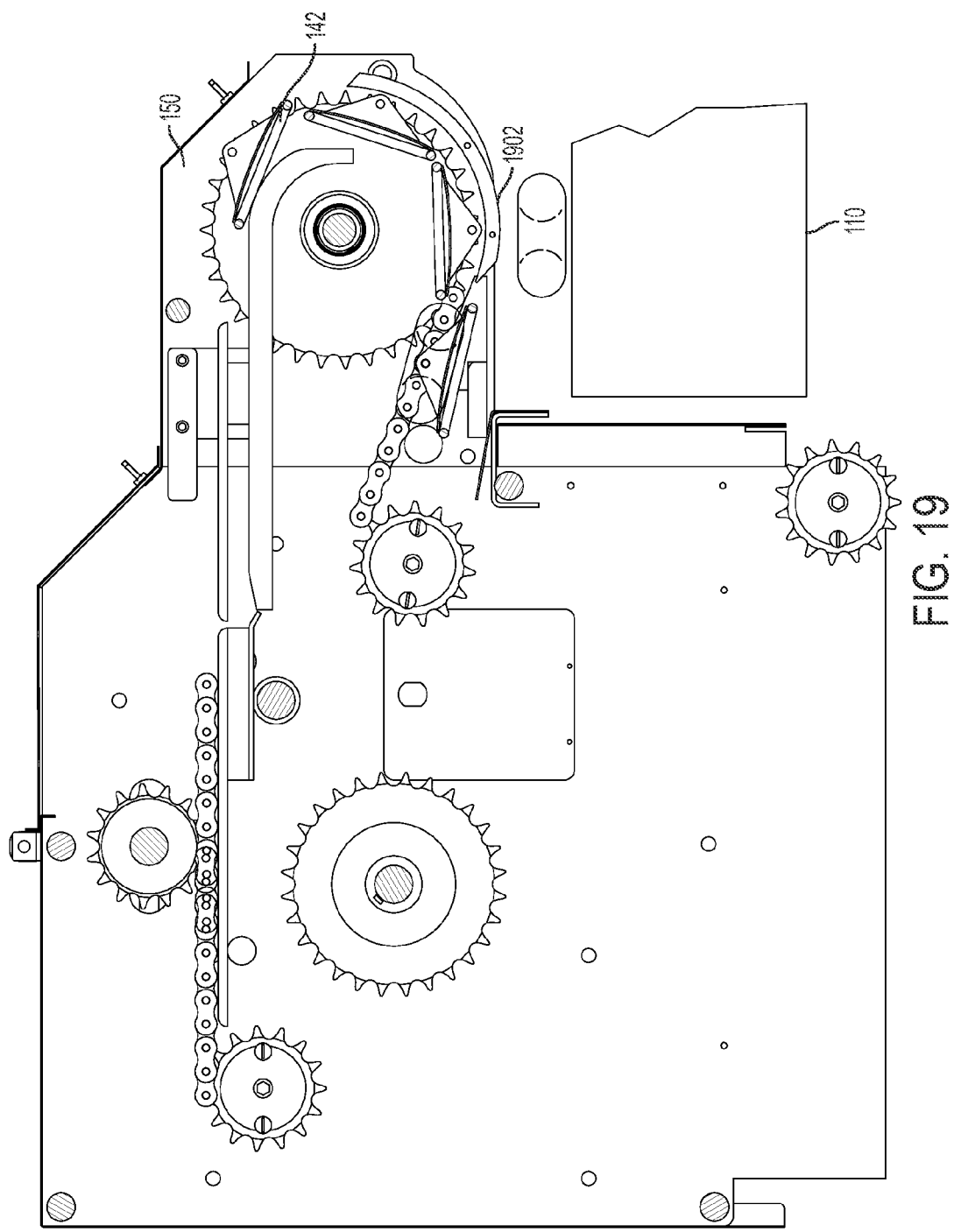
FIG. 19 illustrates a side view of an aspect of a system for preparing dough-based products according to one embodiment of the present invention.

After passing through the proofing chamber 121, the trays 142 are transported to outlet 150, where the dough-based products are emptied from the trays 142 into a fryer 110. Various emptying mechanisms may be used. In one embodiment, the dough-based products are removed by tipping the trays 142 using a tipping cam 1902 as shown in FIG. 19. For example, the tipping cam can be positioned at the outlet end of the proofer such that the trays 142 are rotated and the dough-based products drop or slide off of the trays 142 into the fryer 110. The empty trays 142 then continue along path of chain 145 and return to the inlet 130 where the trays 142 may again be loaded with dough-based product for proofing and/or frying.

The fryer 110 is positioned above the proofer 120. The fryer is advantageously positioned above the proofer 120, as such a configuration, for example, reduces the floor area required to make dough-based products. Fryer 110 comprises a bottom and sidewalls to hold shortening, oil, or other fluids used to cook dough-based products. Fryers that can be used in various embodiments of the present invention can be designed to have different depths and/or volume capacities depending on a number of factors including, for example, the desired throughput of the system, the types of dough-based products to be prepared, the desired cooking temperature, the source of heat, and other factors. In one embodiment in which doughnuts are to be prepared by frying uncooked dough in shortening, the depth of fryer 110 can be less than about 20 inches. In other embodiments, the depth of fryer 110 is less than about 16 inches, less than about 12 inches, or less than about 8 inches.

Figure 7:
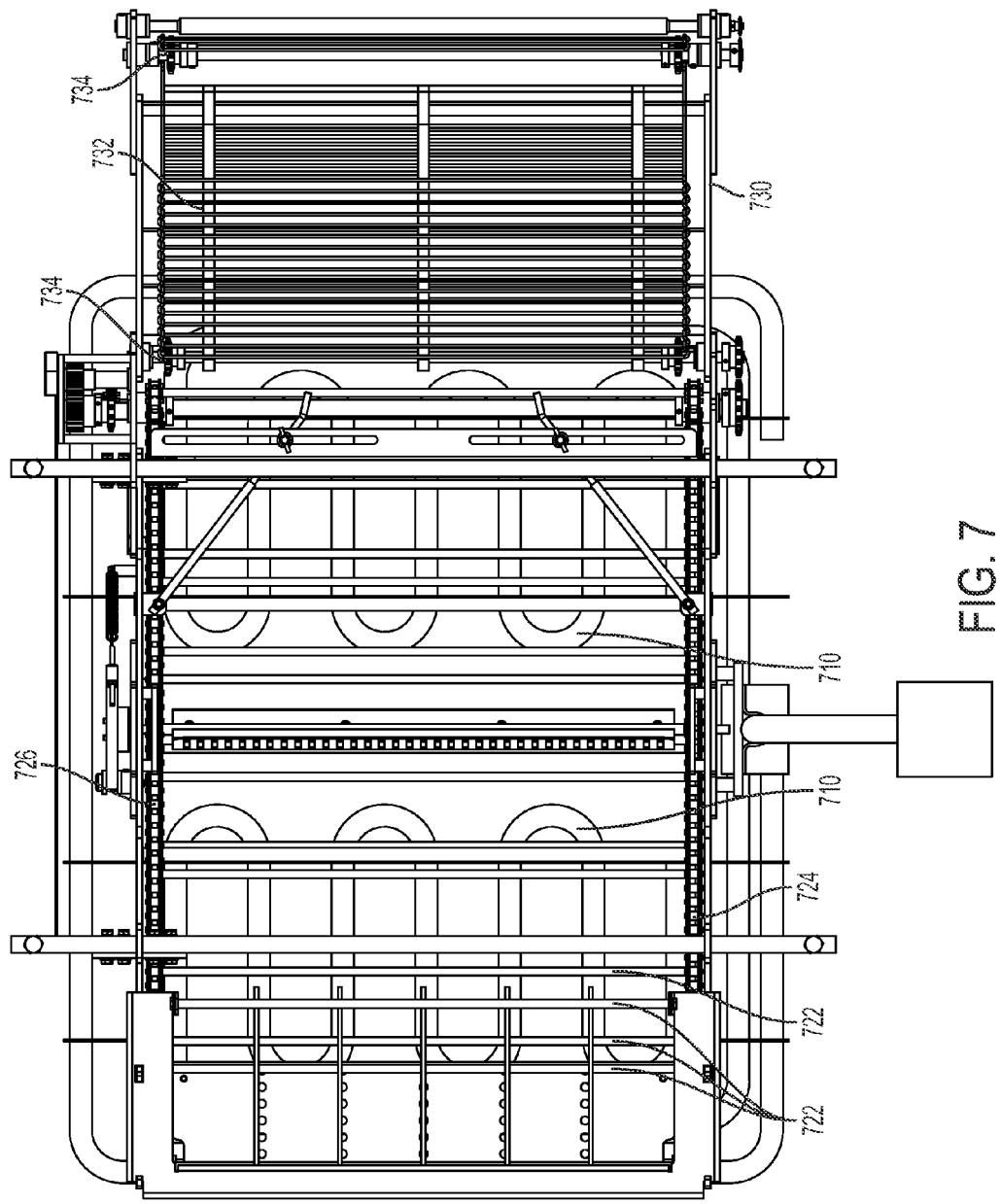
FIG. 7 illustrates a top view of an aspect of a system for preparing dough-based products according to one embodiment of the present invention.
Figure 10:
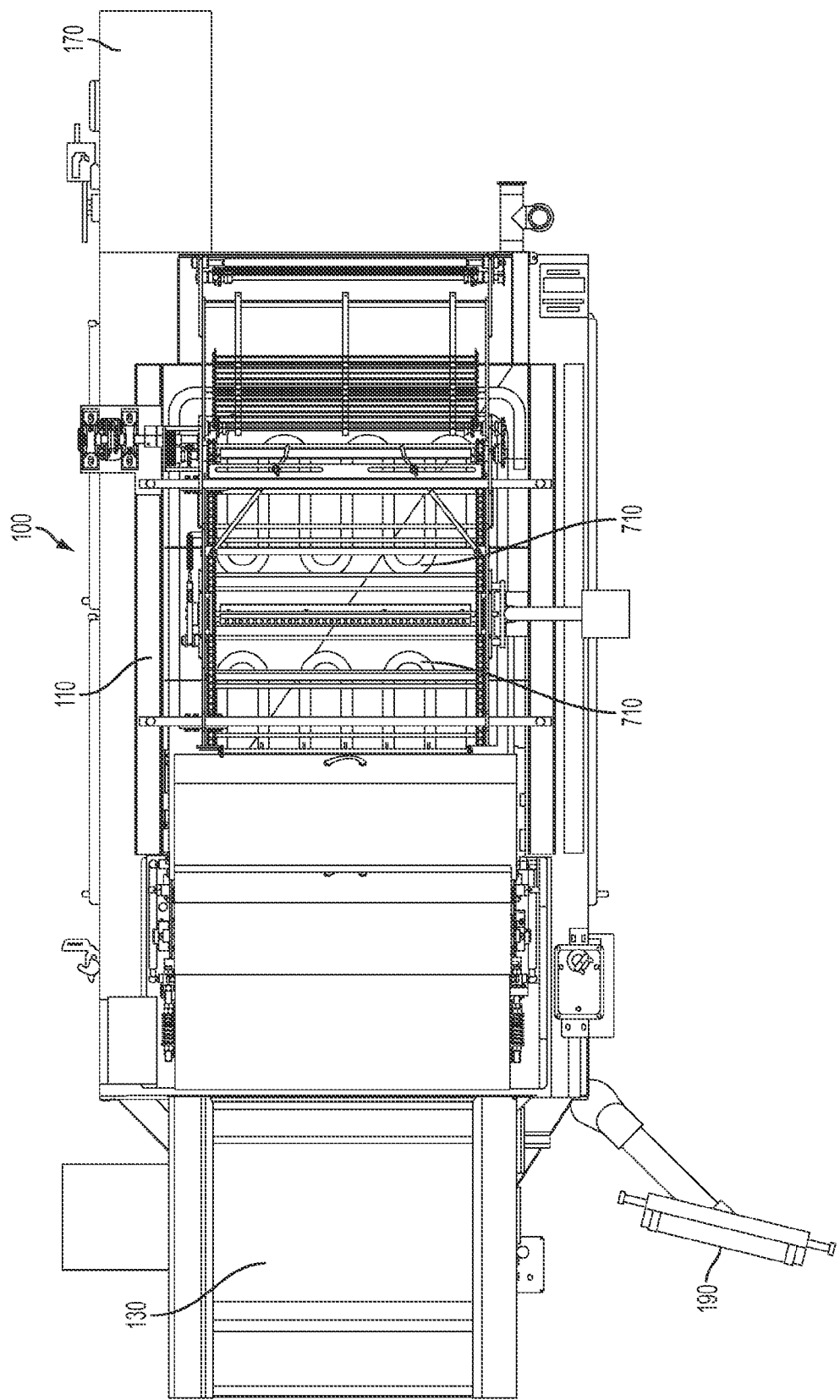
FIG. 10 illustrates a top view of a system for preparing dough-based products according to one embodiment of the present invention.

Upon entering the fryer 110, the dough-based products are cooked. In the embodiment shown, the dough-based products are to be cooked by heated shortening or oil in the fryer 110. As shown in FIGS. 7 and 10, electrical heating elements 710 are positioned inside of fryer 110 to heat the shortening or oil. In some embodiments, gas-fired heating elements can be used to heat the shortening or oil in the fryer.

Figure 6:
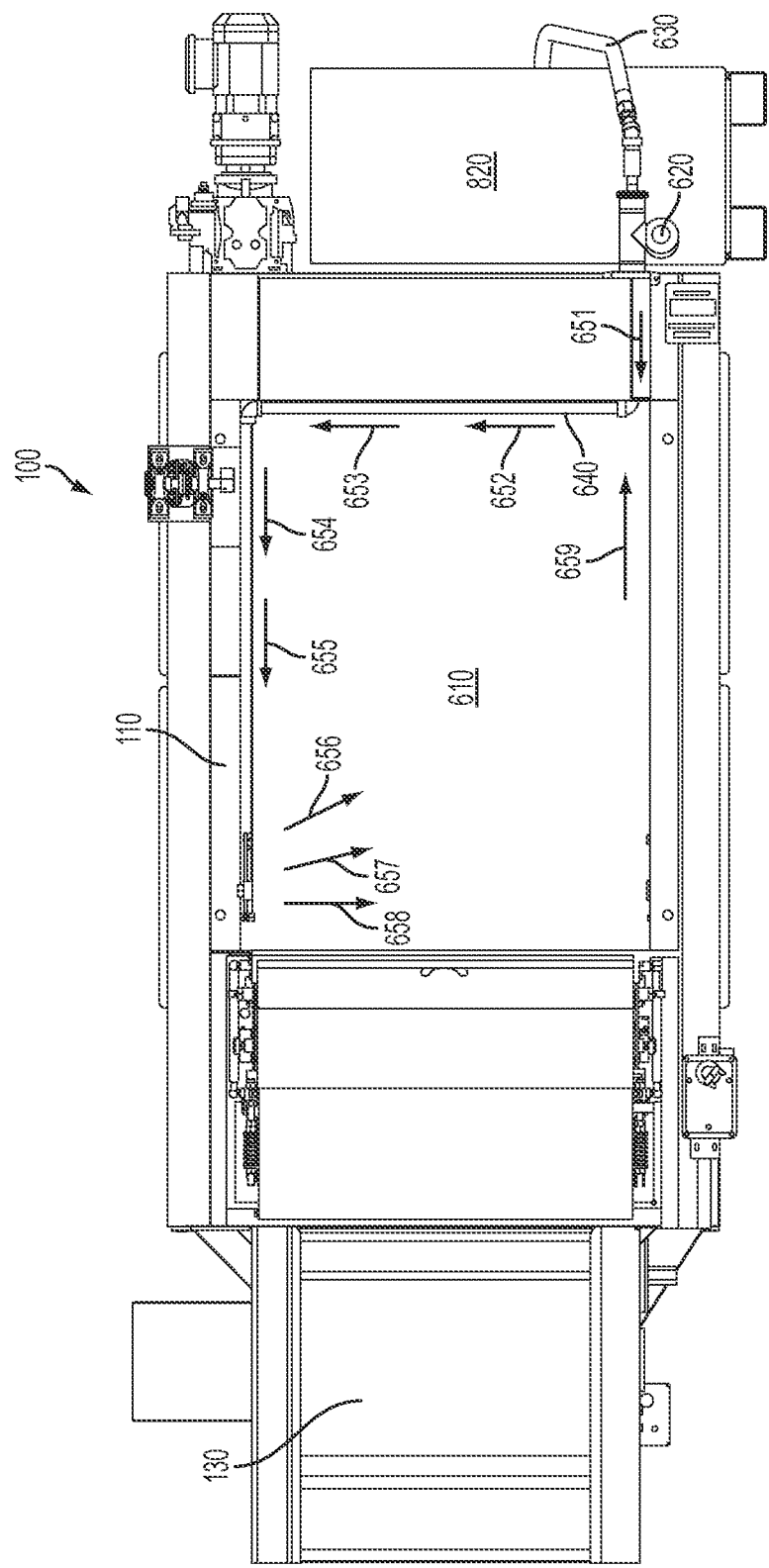
FIG. 6 illustrates a top view of a system for preparing dough-based products according to one embodiment of the present invention.
Figure 9:
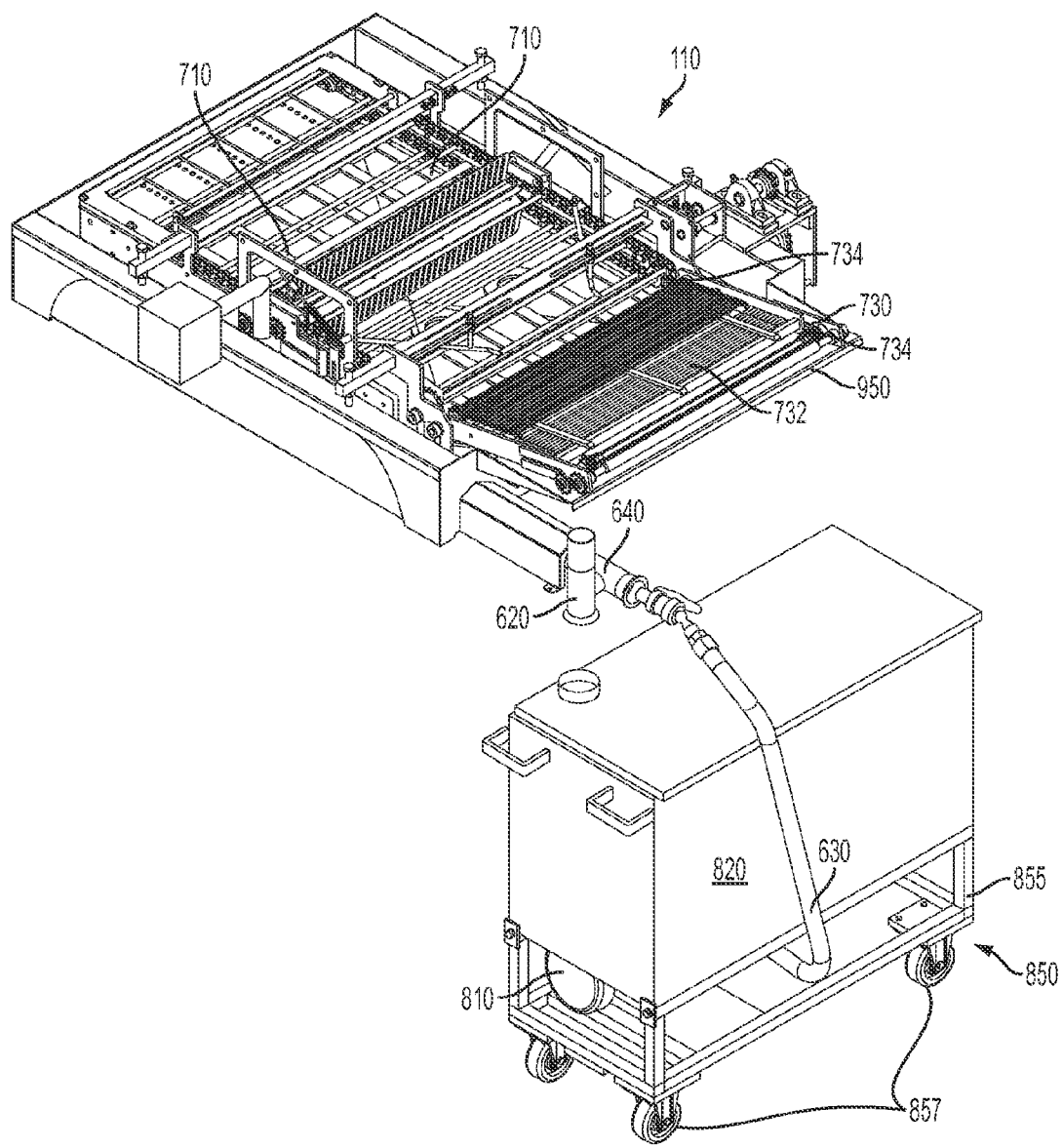
FIG. 9 illustrates a perspective view of an aspect of a system for preparing dough-based products according to one embodiment of the present invention.

In some embodiments, the shortening or other cooking fluid can be circulated (e.g., continually moved within the fryer). While shortening is discussed below, it should be understood that other cooking fluids can similarly be circulated. In the embodiment shown in FIGS. 8 and 9, the shortening is circulated using a pump 810. As shown in FIGS. 6, 8 and 9, the pump 810 pumps shortening from the tank 820 through a shortening fill hose 630 coupled to a pipe 640. The shortening is pumped through pipe 640 as represented by flow arrows 651-655 in FIG. 6. At the distal end of the pipe 640 furthest from the coupling to hose 630, pipe 640 comprises a manifold consisting of perforations for directing the shortening into the fryer vat 610 of fryer 110. As demonstrated by flow arrows 656-658 in FIG. 6, the shortening is directed in varying directions into the vat 610 before returning to tank 820 through level adjustment device 620. In such an embodiment, the manifold of pipe 640 is used in conjunction with the pump 810 to optimally circulate the shortening to minimize hot spots caused by oxidation of shortening in close contact with the heating elements 210.

Figure 15:
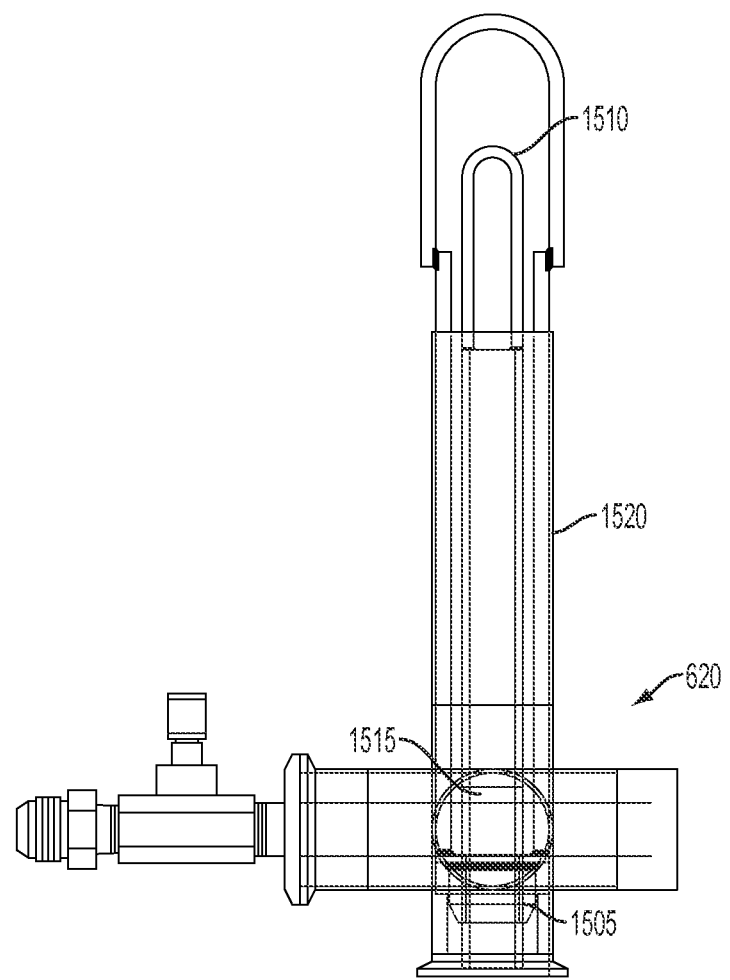
FIG. 15 illustrates a side view of an aspect of a system for preparing dough-based products according to one embodiment of the present invention.

The level adjustment device 620 according to one embodiment is shown in detail in FIG. 15. Level adjustment device 620 comprises an exterior housing 1520, a drain 1505, a threaded tube 1515 that screws into drain 1505, and a handle 1510 coupled to threaded tube 1515 for screwing the tube up or down to adjust the shortening level within the fryer. Excess shortening overflows through the center of tube 1515 thereby maintaining the level of the shortening in the fryer at a level corresponding to the top of tube 1515.

In one embodiment, the shortening level in fryer 110 may be configured using level adjustment device 620 to minimize the amount of waste shortening produced by operation of the apparatus. For example, in one embodiment the shortening level in fryer 110 may be configured to be approximately six inches. In such an embodiment, a majority of the shortening in the fryer 110 may be absorbed by the dough-based products cooked therein, thereby minimizing the amount of waste shortening. In other embodiments, other shortening levels may be configured.

Additional shortening may be supplied to the system as needed. In one embodiment, shortening may be provided directly into fryer 110. For example, shortening cubes may be added directly to tank 820. In other embodiments, the pump 810 and tank 820 may be attached to a cart 850 comprising a frame 855 and wheels 857 as shown in FIGS. 8 and 9. In such an embodiment, multiple carts 850 may be interchangeably used to quickly provide a fresh shortening supply to system 100. For example, when the shortening level of a tank 820 of a first cart 850 becomes low, the first cart 850 may be decoupled from the system 100 and a second cart 850 with a sufficient shortening supply in tank 820 may be wheeled into place and coupled to the system 100 as described above.

The dough-based products are moved through the fryer using fryer conveying mechanism 720 as shown in FIG. 7. The conveying mechanism 720 in the embodiment shown is comprises of a series of flight rods 722 transported by chains 724, 726 driven by a motor housed within drive motor cabinet 170 (shown in FIGS. 1, 2, 10, 13 and 16). The drive motor configuration within the drive motor cabinet 170 is described below.

Figure 14:
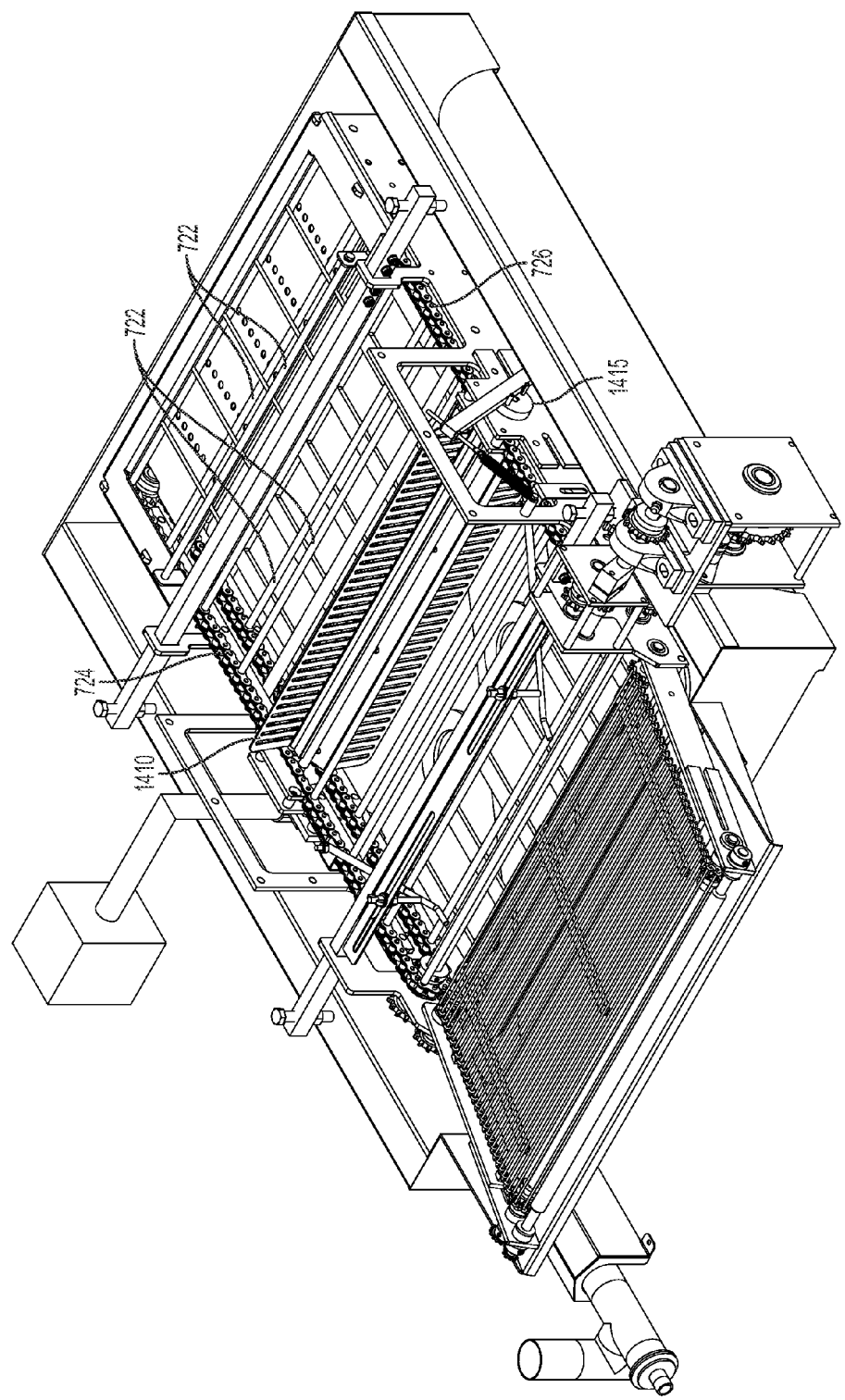
FIG. 14 illustrates a perspective view of an aspect of a system for preparing dough-based products according to one embodiment of the present invention.

In one embodiment, as the dough-based products move through the fryer 110, a flipping mechanism is used to flip the dough-based products to provide thorough and even cooking of the dough-based products. As shown in FIG. 14, flipping mechanism comprises a rectangular-shaped flat grated flipping member 1410. The distal ends of flipping member 1410 are pivotably mounted at their mid-points to two pivot points. During operation, flight rods 722 coupled to chains 724, 726 push against the flipping member 1410 causing it to rotate and flip dough-based products. A spring-loaded turner cam 1415 snaps the flipping member 1410 into a ready position at the end of its rotation to be ready to be engaged by the next flight rod 722.

Once the dough-based products are cooked, they are removed from the fryer vat 610 using an extraction conveying mechanism. As shown in FIGS. 7 and 9, among others, one embodiment of an extraction conveying mechanism 730 comprises interlocking cross-members that form a flexible slatted conveyor belt 732. The slatted configuration permits excess shortening, oil, or other fluid to drip from the dough-based products through the openings between the slats onto slide 950, shown in FIG. 9. The excess shortening may then proceed down the slide 950 back into fryer vat 610. The conveyor belt 732 is driven by a drive motor housed within drive motor cabinet 170. The drive motor configuration within the drive motor cabinet 170 is described below. Conveyor belt 732 is guided by a series of guide sprockets 734.

The extraction conveying mechanism 730 may convey the dough-based products onto an exit conveyor where they may be transported to be packaged, to be sold or for additional processing. Examples of further processing can include, without limitation, cooling, glazing, icing, filling, and/or topping the dough-based products.

Figure 11:
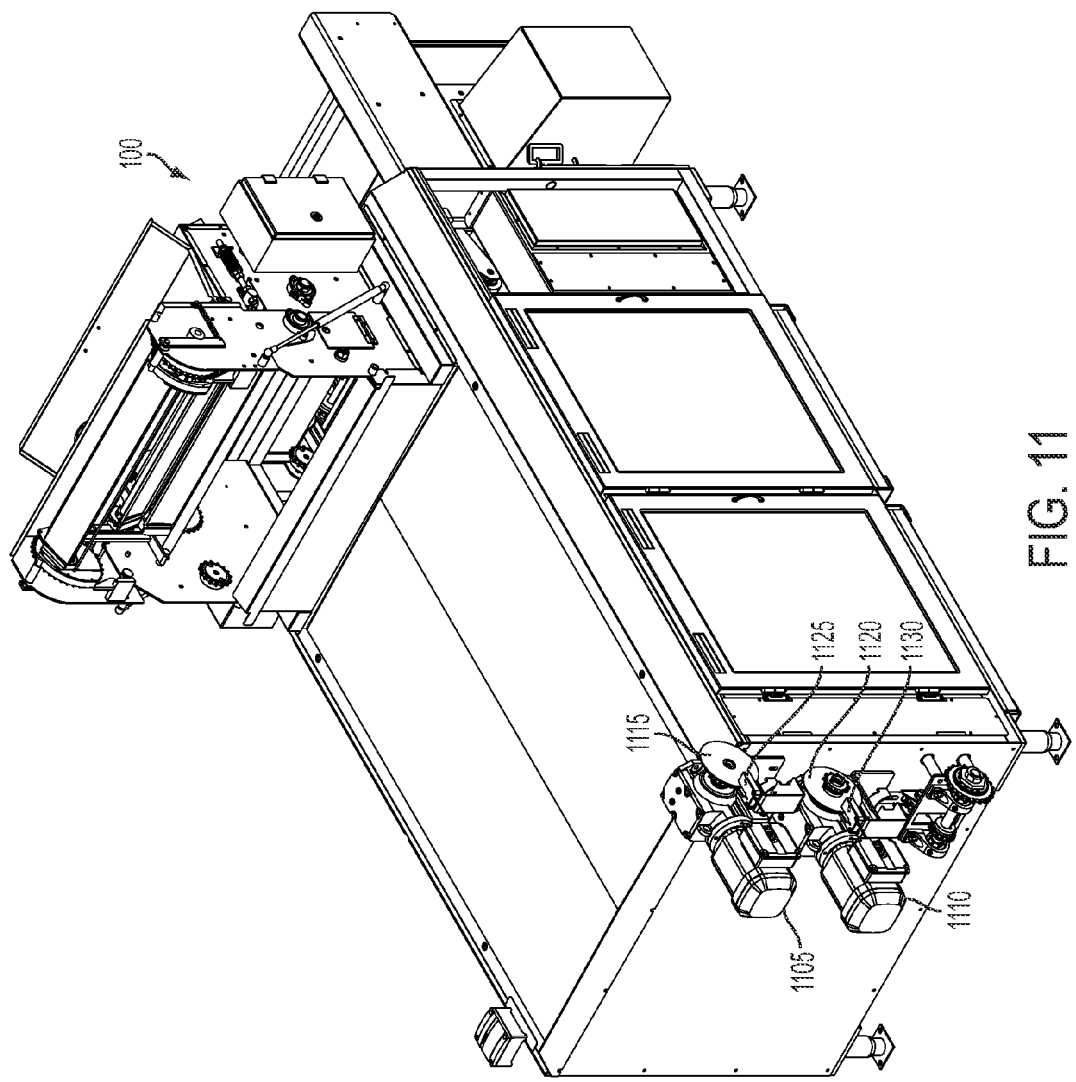
FIG. 11 illustrates a perspective view of a system for preparing dough-based products according to one embodiment of the present invention.
Figure 12:
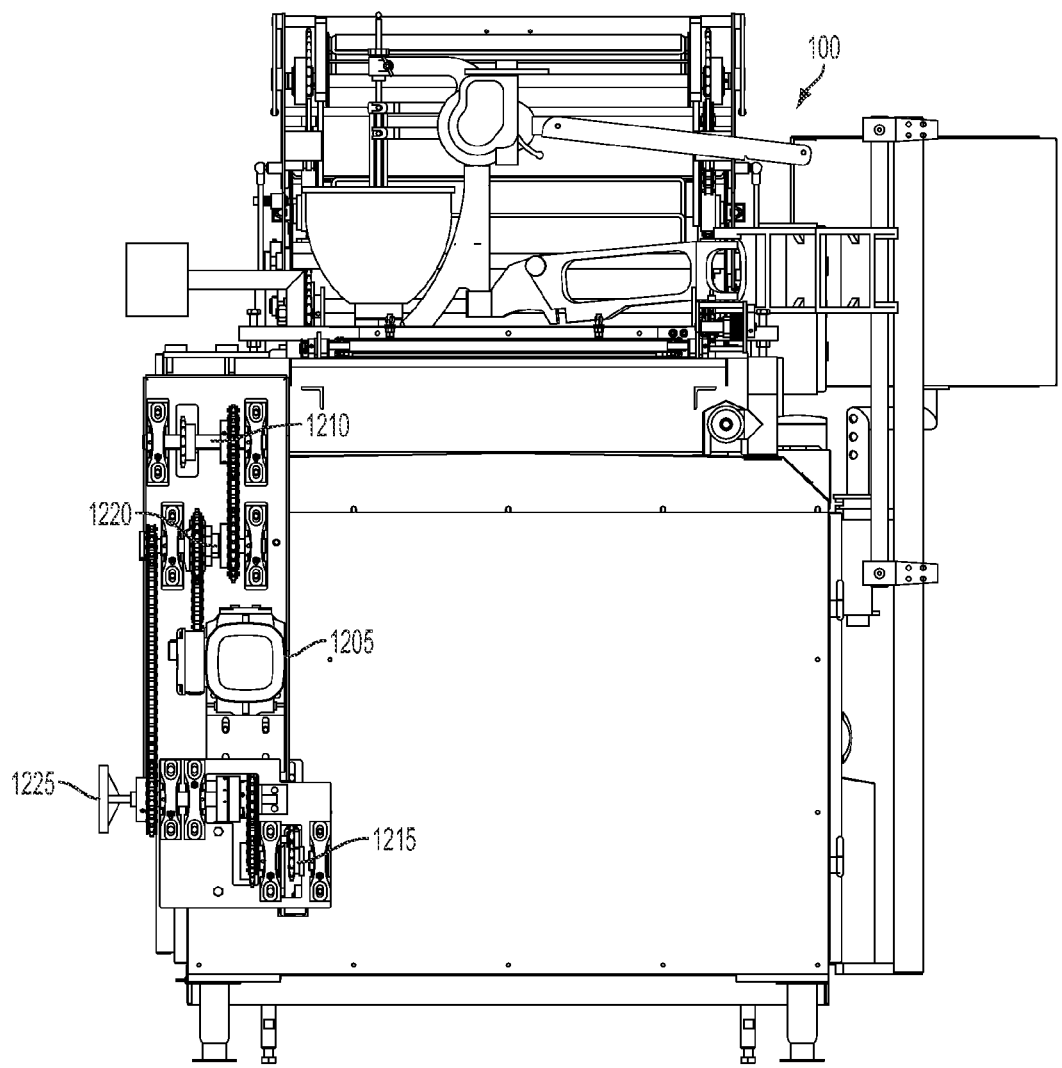
FIG. 12 illustrates a front view of a system for preparing dough-based products according to one embodiment of the present invention.

Exemplary drive motor configurations within drive motor cabinet 170 are shown in FIGS. 11 and 12. The drive motor configuration of the embodiment illustrated in FIG. 11 comprises a fryer drive motor 1105, a proofer drive motor 1110, drive sprockets 1115 and 1120, and timing sensors 1125 and 1130. Timing sensors 1125 and 1130 are used to determine the proper timing positions between the drive motors 1105 and 1110. The output of the sensors is used to adjust the speeds of one or both of the motors 1105 and 1110 to align the operation of the fryer and the proofer. Such sensors and speed adjustments can be configured using techniques known to those of skill in the art.

The drive motor configuration of the embodiment illustrated in FIG. 12 comprises a drive motor 1205, fryer drive shaft 1210, proofer drive shaft 1215, a jackshaft 1220, and an engagement clutch 1225. The drive motor 1205 drives jackshaft 1220, which in turn drives fryer drive shaft 1210 and proofer drive shaft 1215 through chains and sprockets as shown. Engagement clutch 1225 may be used to engage/disengage the operation of the proofer drive shaft 1215.

Figure 16:
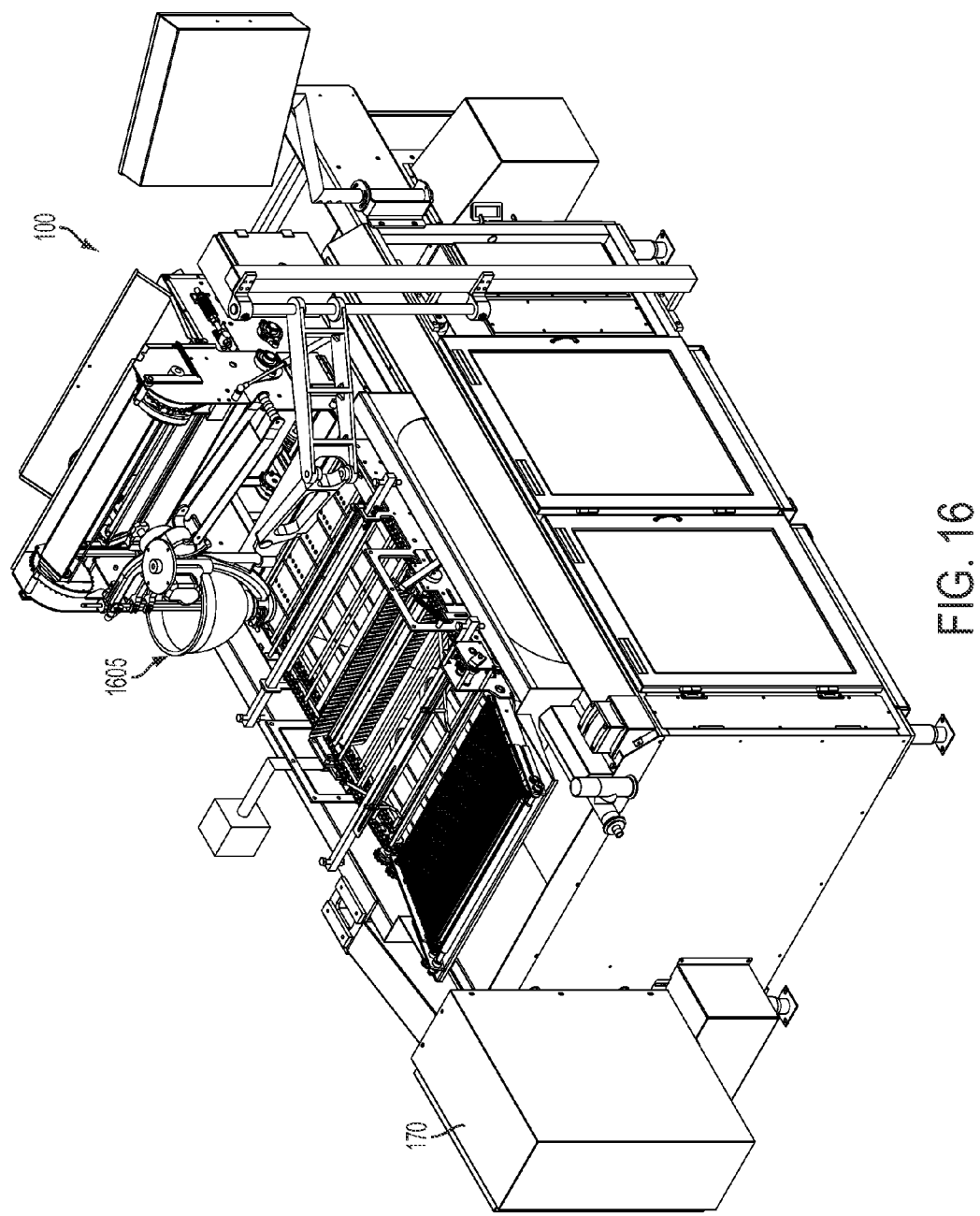
FIG. 16 illustrates a perspective view of a system for preparing dough-based products according to one embodiment of the present invention.

In another embodiment, the system 100 may be configured to allow attachment of one or more devices for supplying dough-based products directly into fryer 110, bypassing proofer 120. For example, when the dough-based products are cake doughnuts (e.g., doughnuts that do not include yeast or do not need to be proofed), the uncooked dough-based products can be provided directly to the fryer 110 in some embodiments. In particular, outlet 150 may be configured to be movable about pivot point 152 between a horizontal position 153 (as shown in FIG. 1) and a vertical position 154 (as shown in dashed lines in FIG. 1 and as also shown in FIG. 16). While in the horizontal position 153, the outlet is operative to empty dough-based products coming from the proofer 120 on trays 142 into the fryer 110. If the dough-based products are not to be provided to the fryer 110 using trays 142, the outlet 150 may be placed in the vertical position 154 to allow for the attachment of one or more devices for supplying dough-based products directly into fryer 110. For example, outlet 150 may be placed in vertical position 154 to allow for the attachment of a device for forming cake doughnuts and dropping the formed cake doughnuts into fryer 110. In some embodiments, such as the one shown in FIG. 16, a Belshaw Type F Cake Donut Depositor 1605 can be used with the system.

Various equipment can be used in assembling systems according to various embodiments of the present invention. One non-limiting example of a motor useful for transporting the trays through the system in some embodiments is a gear motor such as Model No. S57DRS71M6 from SEW-Eurodrive. A non-limiting example of a gearbox useful for reducing the power output of the motor in some embodiments is a parallel gearbox having an output of seven revolutions per minute. While chains and sprockets are described in the illustrated embodiments, other means of transporting the trays may be used.

Various circulation fans can be used in the proofer depending on the size and desired output of the proofer including fans commercially available from the Berquist Torrington Company in a stainless steel housing. However, other conventional fans known in the art may also be used.

A non-limiting example of a pump useful in some embodiments of the present invention is Model No. GPV-0514-149 commercially available from Viking Pump, Inc.

In some embodiments of systems of the present invention, a number of process parameters may be controlled. Non-limiting examples of such parameters include conveyor speed, circulation fan speed, air temperature, fryer temperature, and/or humidity may be controlled. A control panel (item 190 in FIG. 1) may be utilized to provide a centralized location to view information and control the parameters in some embodiments. The control panel may include displays, warning lights, power switches and controls for each parameter. The control panel may also include an emergency stop or shut-off button and/or a master power switch that controls power to the entire apparatus. These features can be designed and configured using techniques and equipment known to those of skill in the art.

In some embodiments, information about conveyor speed can be displayed on the control panel. The conveyor speed determines the amount of time that the trays transporting the dough-based products stay in the system 100, particularly the amount of time that the dough-based products stay in the proofing chamber 121. The control panel can include a conveyor speed indicator (displayed, for example, in inches per minute), a conveyor start button, a conveyor stop button and a conveyor speed control. The conveyor speed may be controlled, for example, by adjusting the speed of the conveyor motor using an inverter. The inverter controls the amount of electricity delivered to the motor, thereby controlling the motor speed. An inverter fault indicator may also be located on the control panel.

In some embodiments, information about the circulation fan speed can be displayed on the control panel. The circulation fan speed determines the rate at which air is blown into the proofing chamber 121. For example, at higher speeds, the flow rate (often measured in cubic feet per minute) is greater. The control panel, in some embodiments, can include a circulation fan start button, a circulation fan stop button, a circulation fan speed indicator (displayed, for example, in revolutions per minute of the fan), and a circulation fan speed control. As with conveyor speed, the circulation fan speed may be controlled by adjusting the speed of the circulation fan motor using an inverter. An inverter fault indicator may also be located on the control panel. The apparatus may include an automatic cut off switch if the circulation fan speed is too low. For example, the apparatus may be set to automatically cut off if the circulation fan speed is below 500 revolutions per minute. In some embodiments, rather than controlling the circulation fan speed, the speed of the circulation fan can be set to a constant value.

The air temperature may also be controlled in some embodiments. Air temperature may be measured using a temperature sensor or thermocouple. The temperature may be adjusted using digital controls using techniques known to those of skill in the art.

The humidity in the proofing chamber 121 may also be controlled in some embodiments. The relative humidity may be measured by positioning a humidity sensor in the proofing chamber 121. The humidity in the proofing chamber 121 may be controlled by activating the humidifier when the humidity in the heating section gets below a target level, causing the heating elements to boil water and produce steam. The steam mixes with the heated air within the humidity box and the heated and humidified air is blown into the proofing chamber by the circulation fan.

In some embodiments, a control panel can require a passcode to access the controls. Use of a passcode, in some embodiments, can be used, for example, to restrict access to information stored in, or accessed by, the control panel, and/or to restrict the ability of certain users to modify information stored in, accessed by, or controlled by the control panel. In some embodiments, the passcode can periodically change such that the inability to enter a correct passcode can prohibit a user from operating the machine. For example, the control panel, in some embodiments, can be accessed remotely (e.g., from another computer system or device) to change the password so as to prohibit access in the appropriate circumstance. Updated passcodes can be communicated to the appropriate users at a desired time to permit continued or restored operation of the machine.

FIG. 20 is a perspective view of a system for preparing dough-based products according to one embodiment of the present invention. As discussed above, in one embodiment proofer 120 comprises a wall 2012 shared by the humidity box 123 and the proofing chamber 121 that defines holes 2010 through which heated and/or humidified air may flow into the proofing chamber 121 from humidity box 123.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

What is claimed is:

1. A system for preparing dough-based products comprising:
    a fryer comprising a bottom and at least one sidewall;
    a proofer comprising a proofing chamber with a top, bottom, and at least one sidewall and a first heater and a second heater;
    a fan in fluid communication with the first heater and the second heater, the fan being positioned at a first end of the proofer chamber;
    a first air return duct coupled to the first heater and a second air return duct coupled to the second heater, the air return ducts being positioned at the bottom of each side of the proofing chamber and the air return ducts each comprising an opening located at a distal end from the first end of the proofing chamber such that air is drawn from the proofing chamber into each of the openings and returned to the fan;
    a conveying mechanism configured to transport the dough-based products on at least one tray from the proofing chamber to the fryer, and
    a tipping cam positioned at an outlet end of the proofer which rotates the at least one tray such that the dough-based products are transported to the fryer,
    wherein the top of the proofing chamber is located below the bottom of the fryer.

2. The system of claim 1, wherein the proofer comprises a sensor, wherein the sensor is positioned in the proofing chamber.

3. The system of claim 2, wherein the sensor is a temperature sensor.

4. The system of claim 1, wherein the first heater and the second heater are positioned at one end of the proofer.

5. The system of claim 1, further comprising a humidifier disposed within the proofer.

6. The system of claim 5, further comprising a humidity sensor positioned within the proofing chamber.

7. The system of claim 1, wherein the conveying mechanism comprises:
    a plurality of moveable trays coupled to at least one chain; and
    a motor coupled to the at least one chain.

8. The system of claim 1, wherein the height of the at least one side wall of the fryer is less than about 20 inches.

9. The system of claim 1, wherein the fryer comprises a manifold defining a plurality of perforations.

10. The system of claim 1, wherein the fryer comprises a flipping mechanism comprising a rectangular-shaped flat grated flipping member, wherein the flipping member is pivotally mounted to the fryer such that the flipping member is configured to flip a dough-based product during operation of the fryer.

11. A system for preparing dough-based products comprising:
    a fryer comprising a flipping mechanism configured to flip a dough-based product during operation of the fryer;
    a proofer operatively coupled to fryer, wherein the proofer comprises:
        a housing;
        a proofing chamber disposed within the housing; and
        means for providing heated air to the proofing chamber;
    means for conveying dough-based products through the proofer to the fryer, wherein the means for conveying dough-based products comprises at least one tray and a tipping cam, wherein the tipping cam is positioned at an outlet end of the proofer to rotate the at least one tray such the dough-based products are transported to the fryer,
    wherein the proofer is positioned below the fryer.

12. The system of claim 11, wherein the proofer further comprises means for controlling the temperature of the heated air.

13. The system of claim 12, further comprising means for humidifying the heated air.

14. The system of claim 11, wherein the fryer comprises means for circulating shortening.

15. A system for preparing dough-based products comprising:
    a fryer comprising a bottom and at least one sidewall;
    a proofer comprising a proofing chamber with a top, bottom, and at least one sidewall and a heater;
    a fan in fluid communication with the heater, the fan being positioned at a first end of the proofer chamber;
    an air return duct coupled to the heater, the air return duct being positioned at the bottom of the proofing chamber and the air return duct comprising an opening located at a distal end from the first end of the proofing chamber such that air is drawn from the proofing chamber into the opening and returned to the fan;

a conveying mechanism configured to transport the dough-based products on at least one tray from the proofing chamber to the fryer, and a tipping cam positioned at an outlet end of the proofer which rotates the at least one tray such that the dough-based products are transported to the fryer, wherein the top of the proofing chamber is located below the bottom of the fryer.

16. The system of claim 15, wherein the proofer comprises a sensor, wherein the sensor is positioned in the proofing chamber.

17. The system of claim 15, further comprising a humidifier disposed within the proofer.

18. The system of claim 15, wherein the conveying mechanism comprises:

a plurality of moveable trays coupled to at least one chain; and a motor coupled to the at least one chain.

19. The system of claim 15, wherein the fryer comprises a manifold defining a plurality of perforations.

20. The system of claim 15, wherein the fryer comprises a flipping mechanism comprising a rectangular-shaped flat grated flipping member, wherein the flipping member is pivotally mounted to the fryer such that the flipping member is configured to flip a dough-based product during operation of the fryer.

* * * * *